US010535195B2

(12) United States Patent
Seiler

(10) Patent No.: US 10,535,195 B2
(45) Date of Patent: Jan. 14, 2020

(54) VIRTUAL REALITY SYSTEM WITH DRONE INTEGRATION

(71) Applicant: SonicSensory, Inc., Los Angeles, CA (US)

(72) Inventor: Brock Maxwell Seiler, Jefferson Valley, NY (US)

(73) Assignee: SonicSensory, Inc., Los Angeles, CA (US)

( * ) Notice: Subject to any disclaimer, the term of this patent is extended or adjusted under 35 U.S.C. 154(b) by 122 days.

(21) Appl. No.: 15/400,853

(22) Filed: Jan. 6, 2017

(65) Prior Publication Data
US 2017/0193707 A1      Jul. 6, 2017

Related U.S. Application Data

(60) Provisional application No. 62/275,510, filed on Jan. 6, 2016.

(51) Int. Cl.
| *B64D 31/06* | (2006.01) |
| *G06T 19/00* | (2011.01) |
| *B64C 39/02* | (2006.01) |
| *B64C 27/00* | (2006.01) |

(52) U.S. Cl.
CPC .......... *G06T 19/006* (2013.01); *B64C 27/008* (2013.01); *B64C 39/024* (2013.01); *B64D 31/06* (2013.01); *B64C 2201/12* (2013.01)

(58) Field of Classification Search
CPC ............ B64C 27/008; B64C 2201/024; B64C 2201/108; G06T 19/006
See application file for complete search history.

(56) References Cited

U.S. PATENT DOCUMENTS

| 7,252,265 B2 | 8/2007 | Perlo et al. |
| 8,308,665 B2 | 11/2012 | Harry et al. |
| 8,995,692 B2 | 3/2015 | Efrati |
| D733,089 S | 6/2015 | Khwaja et al. |
| 9,078,065 B2 | 7/2015 | Karam et al. |
| 10,017,249 B1 * | 7/2018 | Tseng .................... B64C 39/024 |
| 2006/0204017 A1 | 9/2006 | Ullmann |

(Continued)

FOREIGN PATENT DOCUMENTS

| CA | 149923 | 2/2015 |
| CA | 155663 | 2/2015 |

(Continued)

OTHER PUBLICATIONS

AmBX, Wikipedia [online], [retrieved on Dec. 6, 2016]. Retrieved from the Internet <https://en.wikipedia.org/wiki/amBX>.

(Continued)

*Primary Examiner* — Anshul Sood
(74) *Attorney, Agent, or Firm* — Neal, Gerber & Eisenberg LLP; Michael G. Kelber; Nawshaba Siddiquee

(57) ABSTRACT

A virtual reality system includes a drone including a rotor, a display, an audio speaker, a body harness having adjustable straps, and one or more processors in operative communication with the display, the audio speaker, and the drone. The drone may be fixed to the body harness. The one or more processors may be configured to issue audio-visual content to the display and audio speaker and control the rotor based on the issued audio-visual content.

15 Claims, 16 Drawing Sheets

(56) References Cited

U.S. PATENT DOCUMENTS

| | | | |
|---|---|---|---|
| 2007/0171199 A1* | 7/2007 | Gosselin | G06F 3/011 345/156 |
| 2011/0034253 A1* | 2/2011 | Roll | A61H 1/02 463/47 |
| 2013/0072835 A1 | 3/2013 | Harry et al. | |
| 2013/0218456 A1 | 8/2013 | Zelek et al. | |
| 2013/0237378 A1* | 9/2013 | Carrell | A63C 17/061 482/51 |
| 2015/0063606 A1 | 3/2015 | Alexiou et al. | |
| 2016/0055883 A1 | 2/2016 | Soll et al. | |
| 2016/0214713 A1 | 7/2016 | Cragg | |
| 2016/0214728 A1 | 7/2016 | Rossi et al. | |
| 2016/0264234 A1 | 9/2016 | Vaughn et al. | |
| 2016/0274666 A1 | 9/2016 | Harris | |
| 2016/0300395 A1 | 10/2016 | Bretschneider et al. | |
| 2016/0304217 A1 | 10/2016 | Fisher et al. | |
| 2016/0327950 A1 | 11/2016 | Bachrach et al. | |
| 2016/0349835 A1 | 12/2016 | Shapira | |
| 2018/0126263 A1* | 5/2018 | Seiler | G09B 5/06 |

FOREIGN PATENT DOCUMENTS

| | | |
|---|---|---|
| CN | 205003946 | 1/2016 |
| CN | 205239945 | 5/2016 |
| CN | 205304803 | 6/2016 |
| KR | 20130076844 | 7/2013 |
| KR | 20130086192 | 7/2013 |
| WO | WO 2015/031684 A1 | 3/2015 |
| WO | WO 2015/192042 A1 | 12/2015 |

OTHER PUBLICATIONS

Cardin et al., "Head Mounted Wind," *proceeding of the 20th annual conference on Computer Animation and Social Agents (CASA2007)* No. VRLAB-CONF-2007-136 (2007).

Danieau et al., "Enhancing Audiovisual Experience with Haptic Feedback: A Survey on HAV(E)," IEEE transactions on haptics 6.2: 193-205 (2013).

Hülsmann et al., "Wind and Warmth in Virtual Reality—Requirements and Chances," *Proceedings of the Workshop Virtuelle & Erweiterte Realitat*, (2013).

Moon et al., "Design and Evaluation of a Wind Display for Virtual Reality," *Proceedings of the ACM Sumposium on Virtual Reality Software and Technology* (2004).

"FLYBi: First Drone with Virtual Reality Goggles"; Indiegogo webpage; on or before Oct. 23, 2015 (Oct. 23, 2015): section describing and illustrating (in a .gif) the "Obstacle Avoidance System;" <<https://www.indiegogo.com/projects/flybi-first-drone-with-virtual-reality-goggles-vr#/>>.

The United States Patent and Trademark Office, International Search Report in International Application No. PCT/US17/12617 (dated May 15, 2017).

The United States Patent and Trademark Office, Written Opinion of the International Searching Authority in International Application No. PCT/US17/12617 (dated May 15, 2017).

The International Bureau of WIPO, International Preliminary Report on Patentability for International Application No. PCT/US2017/012617 (dated Jul. 10, 2018).

\* cited by examiner

VIRTUAL REALITY SYSTEM WITH DRONE INTEGRATION

PRIORITY CLAIM

This application claims the benefit of U.S. Provisional Application No. 62/275,510, filed on Jan. 6, 2016, which is hereby incorporated by reference in its entirety.

TECHNICAL FIELD

The present application relates to multiple technology areas, including virtual reality technology, vest or body harness technology, and drone technology. The claimed inventions may combine and thus relate to one or more of these technologies.

BACKGROUND

Virtual reality (VR) systems immerse a user in a three-dimensional world. Many existing VR systems focus on audio and visual sensory immersion, but fail to adequately provide immersion through the sense of touch (or treat touch as an afterthought). For example, existing VR systems typically include a sophisticated headset for audio-visual sensory immersion. These typical VR systems, however, often only engage touch through vibrations generated by a handheld controller. These vibrations are not felt throughout the user's body and thus fail to immerse the user in the VR experience. Although some newer VR systems engage the user's sense of touch, many rely on stationary mechanical devices (e.g., expensive robotic plates or arms). These stationary mechanical devices typically constrain the user's motion. Accordingly, there is a need for a new VR system that enhances VR immersion by engaging the sense of touch without constraining the user's motion.

SUMMARY

A virtual reality system may include a drone with a rotor, a display, an audio speaker, a body harness having adjustable straps, and one or more processors in operative communication with the display, the audio speaker, and the drone. The drone may be fixed to the body harness. The one or more processors may be configured to issue audio-visual content to the display and audio speaker and control the rotor based on the issued audio-visual content.

Additional features and advantages are described in, and will be apparent from, the following Detailed Description and the Figures.

BRIEF DESCRIPTION OF THE DRAWINGS

For a better understanding of the specification, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 24 shows a wearable haptic mode for use with a VR ask for simulating real-time haptic feedback in a virtual environment.

DETAILED DESCRIPTION

Some exemplary and non-limiting embodiments are shown in the Figures and described below, with the understanding that the embodiments are only as an examples. These examples are not intended to limit the claims.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Figure 1:
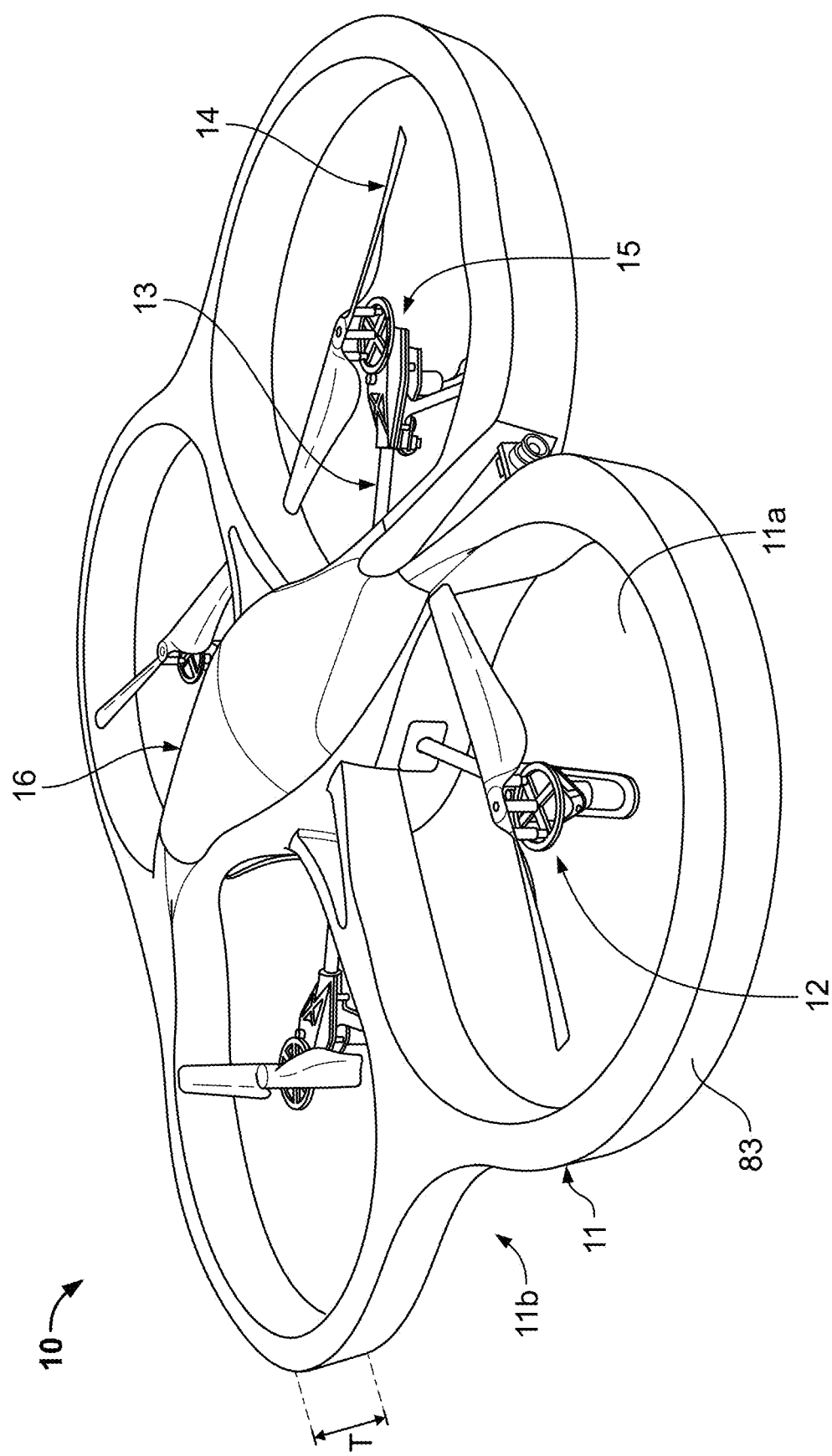
FIG. 1 is a perspective view of a drone.
Figure 2:
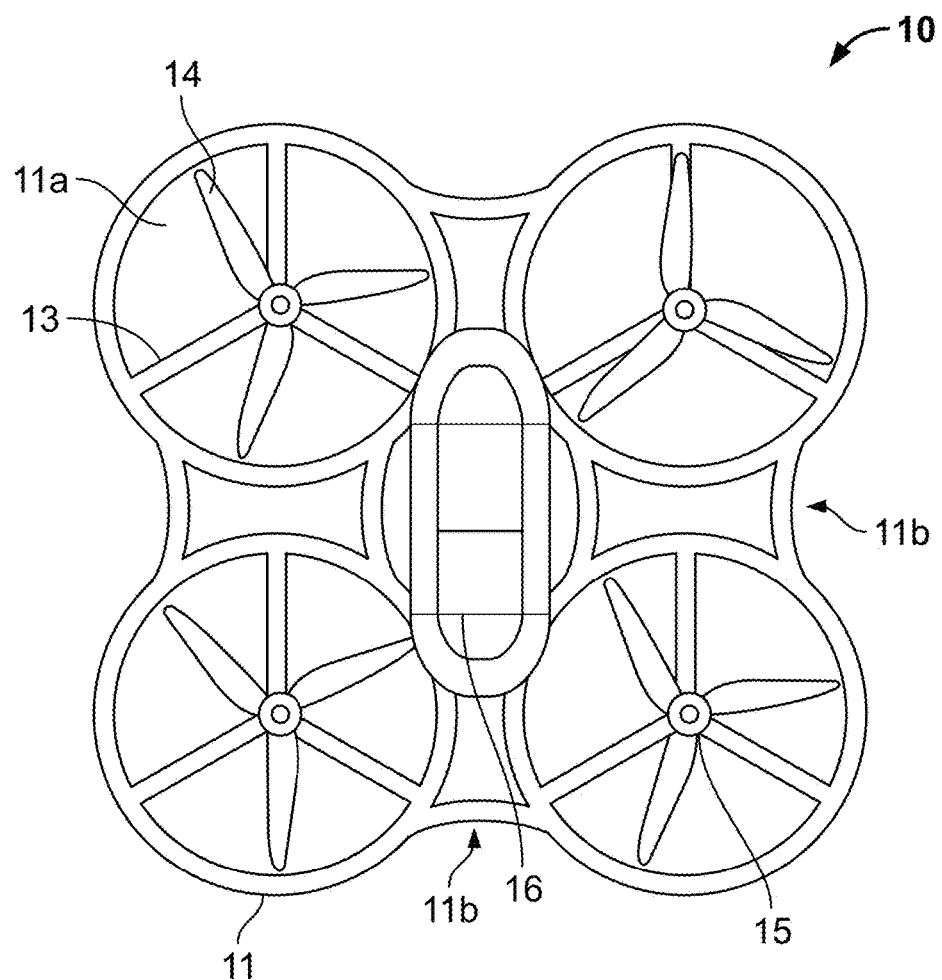
FIG. 2 is a top plan view of the drone with a modified geometry.

Referring to FIGS. 1 and 2, drone 10 (also referred to as a fan assembly, a fan unit, and a fan kit) is a quad rotor design, which is known in the art. Drone 10 includes a main housing 11, four rotor assemblies 12, and a controller housing 16. Main housing 11 defines four cylindrical apertures 11a for accommodating rotor assemblies 12. To reduce weight and drag, main housing 11 defines four inward arced notches 11b. Rotor assemblies 12 each include one or more static supports 13 fixed to main housing 11, a rotor or blade 14, and a motor assembly 15. Each motor assembly 15 includes a brushless electric motor (not shown) in electrical communication with a controller inside controller housing 16. Each rotor or blade 14 is rotatably secured to one motor assembly 15. As such, rotors or blades 14 may each be driven at different rotational velocities and in different rotational directions.

Figure 1A:
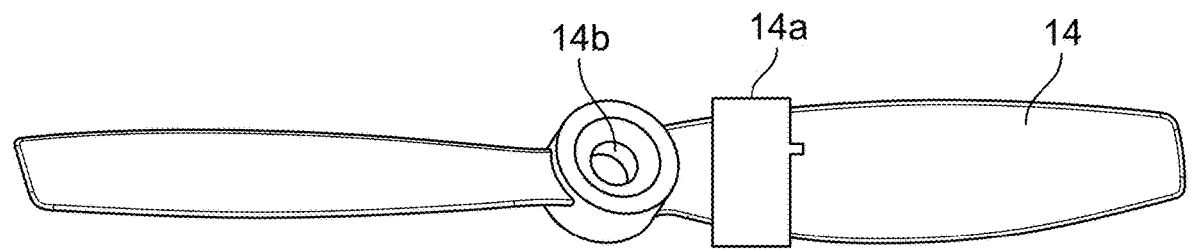
FIG. 1A is a perspective view of a drone rotor.

As shown in FIG. 1A, rotor or blade 14 may be affixed (e.g., via fasteners) to a haptic weight 14a. When haptic weight 14a is present, a center of mass of rotor or blade 14 moves from center 14b to a point in between center 14b and weight 14a. When rotor or blade 14 rotates, the center of mass will continuously change, thus inducing vibrations or oscillations (i.e., haptic feedback). One or more of quad rotors 14 shown in FIGS. 1 and 2 may be affixed to a respective haptic weight 14a.

Figure 3:
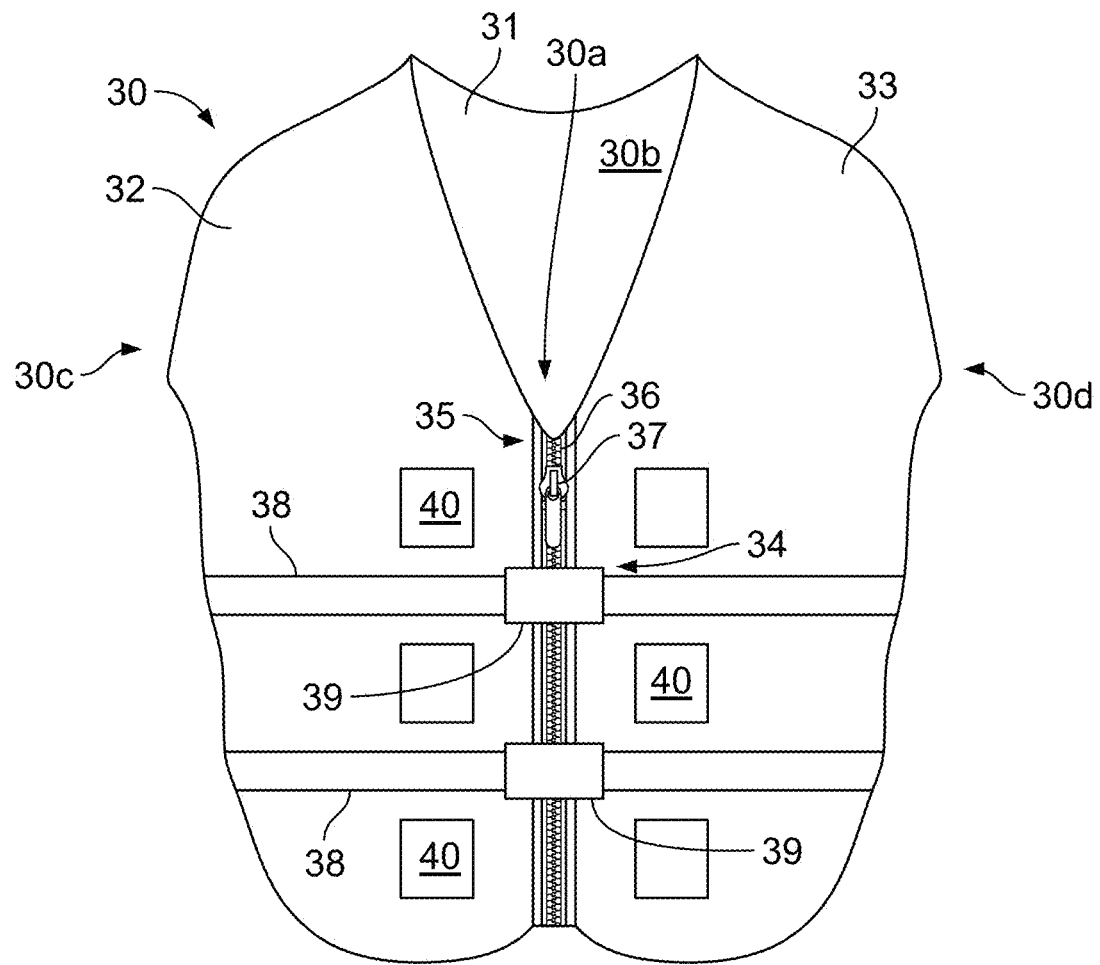
FIG. 3 is a front plan view of a vest.
Figure 4:
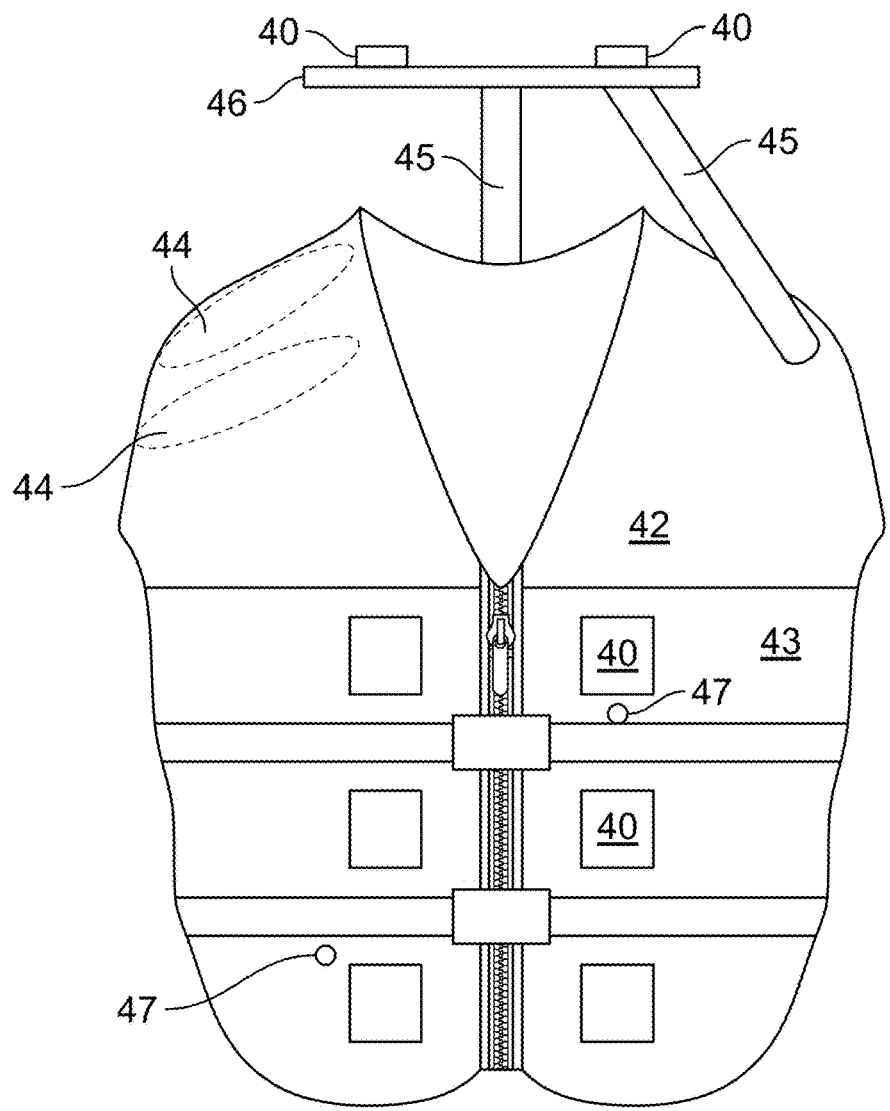
FIG. 4 is a front plan view of the vest showing additional vest features.

Vest 30, shown in FIGS. 3 and 4, is configured to safely secure drone 10 to a user, thus transmitting forces and torques generated by drone 10 to the user. Vest 30 includes a back portion 31, a right shoulder portion 32, a left shoulder portion 33, user fastener assemblies 34 and drone cage fasteners 40. Vest 30 defines a body void 30a, a neck void 30b, a right arm void 30c, and a left arm void 30d. Right and left shoulder portions 32, 33 drape over the user's shoulders. The user's body fits inside body void 30a. The user's neck extends through neck void 30b. The user's arms extend through arm voids 30c, 30d.

User fastener assemblies 34 include a zipper assembly 35 and two buckle assemblies 38, 39. Zipper assembly 35 includes zipper teeth 36 alternating extending from right shoulder portion and left shoulder portion 33, and a zipper 37. Each buckle assembly 38, 39 includes a circumferential strap 38 extending about an outer periphery of vest 30 and a buckle 39. Although not shown, circumferential straps 38 are adjustable. Upon buckling, the user tightens circumferential straps 38 such that vest 30 compresses the user's body.

Figure 3A:
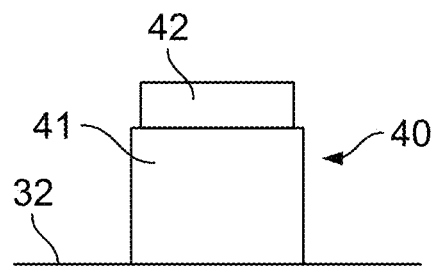
FIG. 3A is a bottom plan view of a drone cage fastener of the vest.

Referring to FIG. 3A, drone cage fasteners 40 may include blocks outwardly extending blocks 41 and fasteners 42 disposed on blocks' surface tips. Blocks 41 are secured to vest 30 (e.g., via glue or other fasteners). Fasteners 42 are secured to blocks 41. Fasteners may be magnets, velcro patches, clips, or any other suitable fasteners. Blocks 41 may be configured to dampen vibration transmitted from the user to drone 10 and from drone 10 to the user. Thus, blocks 41 may be a compressible foam or compressible polymeric material.

As shown in FIG. 4, vest 30 may be divided into an upper portion 42 and a lower portion 43. Upper portion 42 may be rigid (e.g., metal or inflexible plastic). Lower portion 43 may be soft and flexible to enable tightening via buckle assemblies 38, 39. Cushions 44 may inwardly protrude from vest 30 to contact the user's shoulders. Although not shown, cushions 44 may be located on both the right and left sides. Rods 45 may extend from upper portion 42. Although not shown, an additional rod 45 may extend from right shoulder portion 32. Rods 45 may be fixed to (or configured to be fixed to) a plate 46.

Plate 46 connects with a drone cage assembly. Plate 46 may include drone cage fasteners 40. Plate 46 thus (a) serves as a mounting location for a drone cage assembly and (b) as a helmet for the user. At least a portion of plate 46 sits directly above neck void 30b. Plate 46 is configured to fully cover the top of a user's head and thus prevent a drone cage assembly from colliding with the user's head. Although not shown, plate 46 may be dome-shaped to protect sides of the user's head. Plate 46 may define cylindrical apertures (not shown) disposed directly below drone exhaust apertures 11a to enable airflow produced by drone 10 to reach the user.

Although only six drone cage fasteners 40 are shown, vest 30 may include any number of drone cage fasteners 40 for attachment with any number of drones and/or drone cage assemblies. As such, a body harness system may be applied, which includes vest 30 (i.e., a vest portion covering the user's chest area and shoulders). Besides including vest 30, the body harness system may extend to a user's arms and legs, thus enabling arm and leg drone attachments.

Figure 4A:
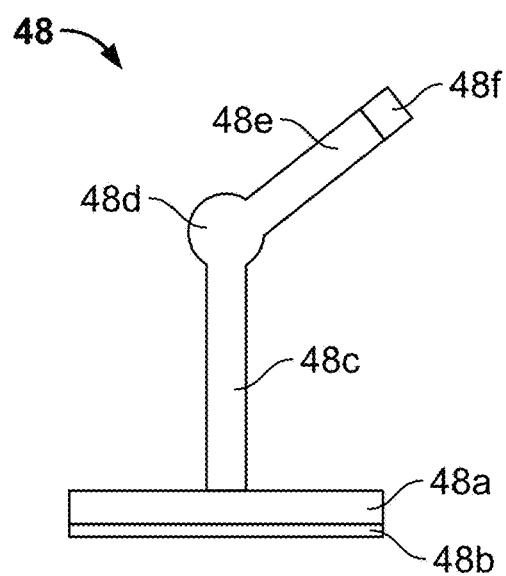
FIG. 4A is a plan view of a tactile vibration transmission arm.

Vest 30 may be configured to accommodate tactile vibration transmission arms 48. As shown in FIG. 4, vest 30 defines apertures 47 for receiving arms 48. With reference to FIG. 4A, each arm 48 may include a base 48a, an adhesive 48b, a base link 48c, a ball joint 48d, a drone link 48e, and an attachment assembly 48f. Adhesive 48b may be applied directly to a user's skin and thus may be a thick gel. Base 48a is configured to impart vibrations generated by drone 10 to the user. Base link 48c, ball joint 48d, and drone link 48e serve as a mechanical path for the vibrations from drone 10 to the user. Ball joint 48d may enable three dimensional rotation of drone link 48e with respect to base link 48c. It should be appreciated that any number of links and ball joints (or other types of joints) may be present. Attachment assembly 48f is configured to secure to motor assembly 15 and/or static supports 13.

By virtue of the secure engagement between attachment assembly 48f and drone 10, haptic feedback (vibrations) generated by drone 10 are transferred to arm 48. Ball joint 48d may include a lock (e.g., a threaded screw extending through the outer ball and configured to press against the inner ball) to prevent movement of link 48c with respect to link 48e and thus maintain integrity of the vibrations.

According to some embodiments, arms 48 may not extend through vest 30. Instead, vest 30 may include attachment regions (e.g., velcro, hooks, counterhooks, etc) and arm 48 may include a counter attachment region 48b (e.g., velcro, hooks, counterhooks, etc) configured to securely engagement the attachment regions. Arm 48 would then transmit vibrations from drone 10 to vest 30, which would then transmit the vibrations to the user.

Figure 5:
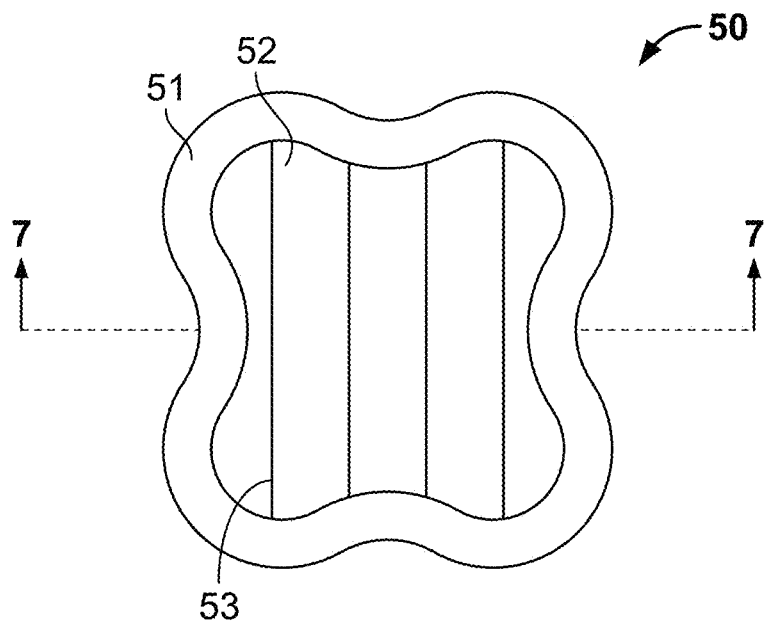
FIG. 5 is a top plan view of a drone cage assembly.
Figure 6:
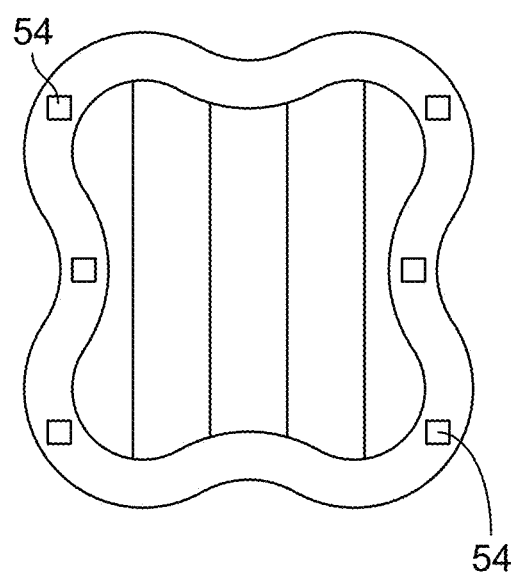
FIG. 6 is a bottom plan view of the drone cage assembly.

FIG. 5 is a top plan view of a drone cage assembly 50, which includes a base 51 defining a drone aperture 52, shields 53, and reciprocal fastener assemblies 54. FIG. 6 is a bottom plane view of drone cage assembly 50. Reciprocal fasteners assemblies 54 secure to fasteners assemblies 40 of vest 30. Returning to FIG. 4, vest 30 is configured for connection with two different drone cage assemblies 50: one drone cage assembly 50 mounts to lower portion 43 and another mounts to plate 46. Reciprocal fasteners assemblies 54 may be velcro, magnets, counterclips (e.g., slots for receiving clips), etc.

Figure 7:
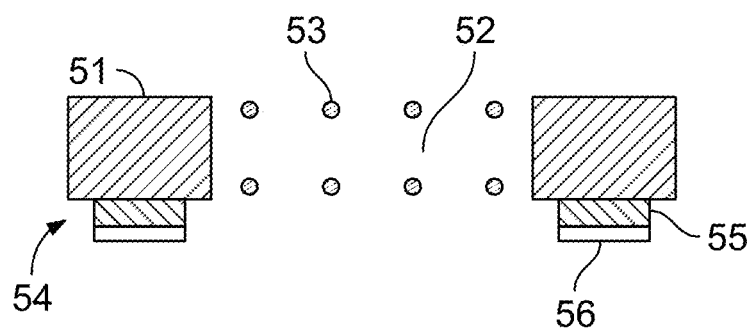
FIG. 7 is a cross sectional view of the drone cage assembly taken along line 7-7 of FIG. 5.

FIG. 7 is a cross sectional view of drone cage assembly taken along line 7-7 of FIG. 5. Reciprocal fasteners assemblies 54 may each include a block 55 and a fastener 56 disposed at a tip or end surface of block 55. Fastener 56 mates with fastener 42 of vest 30. Drone 10 sits inside of drone aperture 52. Shields 53 may be bars configured to snap-fit into base 51. The blocks may be a compressible foam or compressible polymeric material.

Figure 8:
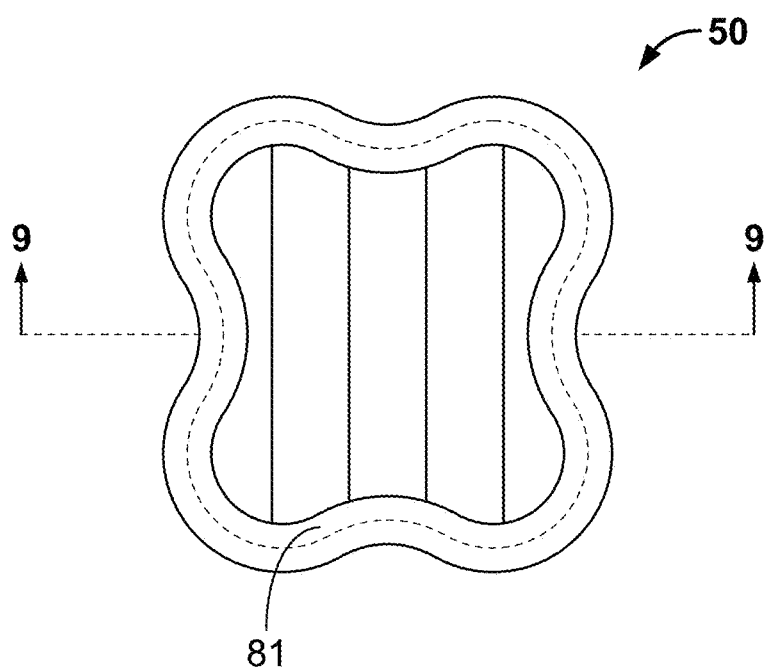
FIG. 8 is a top plan view of first possible modifications to the drone cage assembly.
Figure 9:
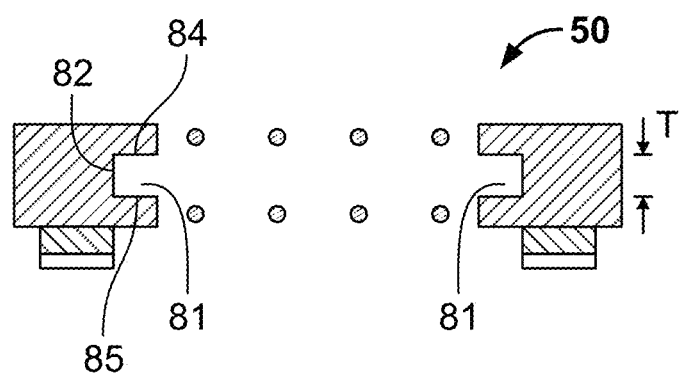
FIG. 9 is a cross sectional view of the drone cage assembly with first possible modifications taken along line 9-9 of FIG. 8.

As shown in FIGS. 8 and 9, drone cage assembly 50 may define an inner perimeter notch 81 for receiving a portion of drone main housing 11. With reference to FIG. 1, drone main housing 11 has a thickness T. Perimeter notch 81 may have the same (or slightly larger) thickness T. During application, the user snaps drone main housing 11 into perimeter notch 81. Perimeter notch 81 corresponds with the contours of drone main housing 11 (i.e., inner surface 82 matches outer surface 83 of drone main housing 11). Top and bottom walls 84, 85 of drone cage assembly 50 contact top and bottom walls (not labeled) of drone main housing 11. Perimeter notch 81 secures drone 10 with respect to drone cage assembly 50. As previously discussed, perimeter notch 81 is sized such that neither top nor bottom walls 84, 85 cover any portion of cylindrical apertures 11*a*.

Figure 10:
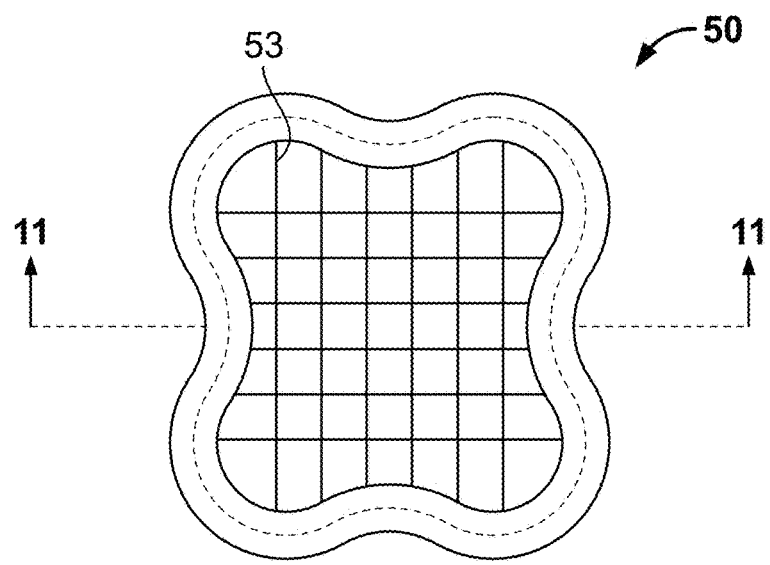
FIG. 10 is a top plan view of second possible modifications to the drone cage assembly.
Figure 11:
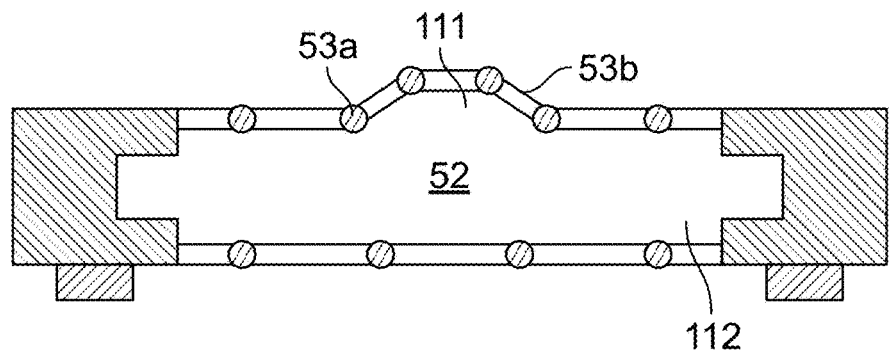
FIG. 11 is a cross sectional view of the drone cage assembly with second possible modifications taken along line 11-11 of FIG. 10.

As shown in FIGS. 10 and 11, shields 53 may include longitudinal and transverse bars 53*a*, 53*b*. Shields 53 may be structured to separate drone aperture 52 into a major aperture 112 and a minor aperture 111. Major aperture 112 accommodates drone main housing 11. Minor aperture 111 accommodates drone controller housing 116.

With reference to FIG. 1A and FIGS. 5 to 11, one or more heating elements may be provided. Each rotor assembly 12 may include a resistive heating element in contact with rotors 14. When rotors 14 are metallic, rotors 14 transfer heat generated by the resistive heating element to air. Alternatively or in addition, some or all of shields 53 may be metallic and may each be in contact with a resistive heating element. Shields 53 transfer heat generated by the resistive heating elements to air expelled by rotors 14. Only shields 53 facing the user, when drone cage assembly 50 is attached to vest 30, may be in contact with the resistive heating elements. As such, only shields 53 on a top or bottom side of drone cage assembly 50 may be in contact with the resistive heating elements.

Although drone 10 has been described as being detachable from vest 30 and drone cage assembly 50, drone 10 may be permanently integrated into vest 30 and/or drone cage assembly 50. In some cases, only portions of drone 10 may be permanently integrated into vest 30 and/or drone cage assembly 50, such some or all of rotor assemblies 12. As such, a vest 30 may include various fan modules (each comprising a housing, a rotor assembly 12 and/or a controller).

Figure 12:
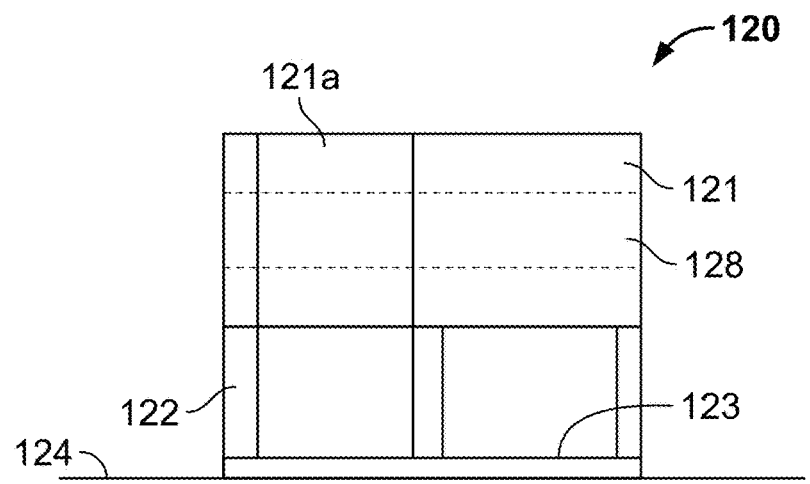
FIG. 12 is a front plan view of a stadium.
Figure 13:
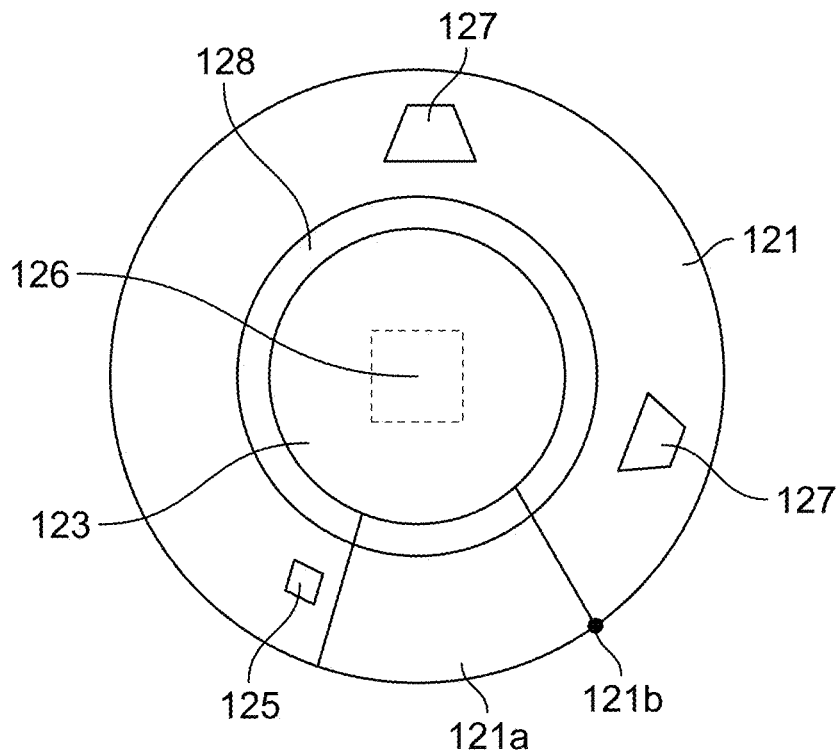
FIG. 13 is a top plan view of the stadium.

With reference to FIGS. 12 and 13, a virtual reality (VR) stadium 120 includes a circumferential wall 121, legs 122, and a platform 123 disposed on ground 124. Stadium 120 is configured to receive a single person on platform 123 and inside of wall 121. VR stadium, however, may be large (e.g., the size of a room) to offer freedom of movement. Wall 121 includes a door 121*a* rotatable about a hinge 121*b*. Door 121*a* includes a latch (not shown) configured to engage a groove in wall 121. Door 121*a* may thus be opened (not shown) for user access into stadium 120.

Stadium 120 may include a door latch sensor 125, a weight sensor integrated into platform 123, IR sensors 127, and cameras (not shown but discussed below). Door latch sensor 125 detects when door 121*a* is fully closed and latched. Weight sensor 126 detects weight exerted by the user on a top flat surface of platform 123. IR sensor 127 detects presence of a person inside VR stadium 120. IR sensor 127 may include an IR transmitter and an IR receiver. A plurality of IR sensors 127 may be provided. IR sensors 127 may be disposed at different vertical heights. For example, one IR sensor 127 may be disposed in a pocket defined by wall 121. Another IR sensor 127 may be disposed on top of wall 121. Sensors 125, 126, 127 are in operative communication with a stadium controller (not shown). Wall 121 may include inner padding 128. According to some embodiments, one or more of the below discussed controllers may be configured to refrain from drone activation (e.g., causing any rotors to spin) until door latch sensor 125 measures a closed door.

Figure 15:
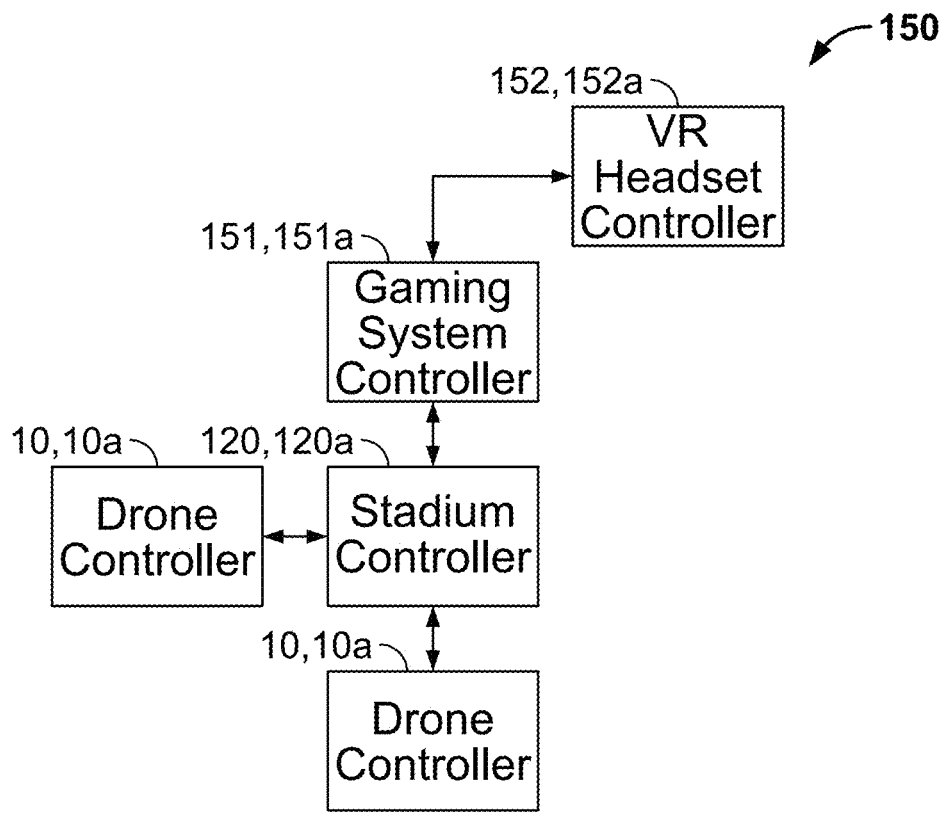
FIG. 15 is a block diagram of a VR arrangement.

FIG. 15 shows a VR arrangement 150. VR arrangement 150 enables user immersion into a VR game. In general, a user wears vest 30 and connects one or more drones 10 thereto via drone cage assemblies 50. The user enters VR stadium 120 wears a VR headset 152. Gaming system 151 executes a game (e.g., Tetris). The game is displayed on VR headset 152. The user controls the game via VR headset 152 and/or one or more user interfaces 105 (e.g., hand-held gaming controllers). The user receives visual and audio feedback via VR headset 152. The user receives haptic and force feedback via drones 10.

Figure 16:
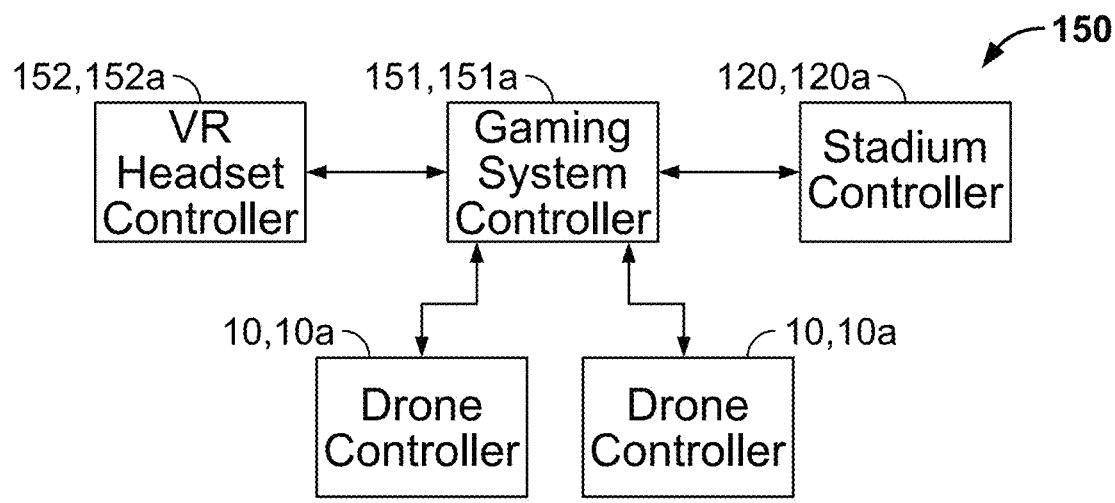
FIG. 16 is a block diagram of a VR arrangement.

In FIG. 15, gaming system 151 is in operative communication with VR headset 152, and stadium 120. Stadium 120 is in operative communication with two drones 10. As such, VR headset 152 is in operative communication with the drones 10 (via gaming system 151 and stadium 120). FIG. 16 shows another VR arrangement 150. In FIG. 15, stadium 120 serves as a hub that governs drones 10 based on outputs from gaming system 151. In FIG. 16, gaming system 151 serves as a hub that governs drones 10. Gaming system 151, VR headset 152, stadium 120, and drones 10 include and house respective controllers 151*a*, 152*a*, 120*a*, 10*a*.

Figure 14:
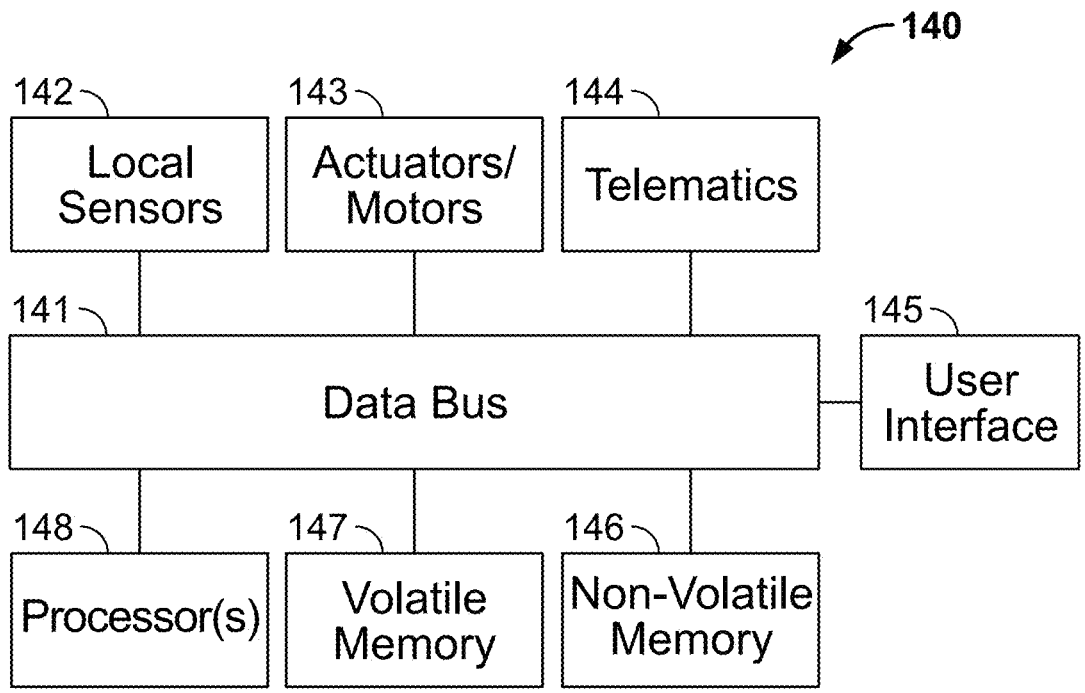
FIG. 14 is a block diagram of a controller.

FIG. 14 shows a generic controller 140. Controllers 151*a*, 152*a*, 120*a*, 10*a* may include any or all of the features of generic controller 140. Generic controller 140 enables automatic control of mechanical systems (if any) and facilitates external communication. Generic controller 140 includes a data bus 141, one or more processors 148, volatile memory 147, non-volatile memory 146, one or more user interfaces 145, telematics 144, actuators and motors 143, and local sensors 142.

Data bus 141 traffics electronic signals or data between the electronic components. Processors 148 performs operations on electronic signals or data to produce modified electronic signals or data. Volatile memory 147 stores data for near-immediate recall by processor 148. Non-volatile memory 146 stores data for recall to the volatile memory 147 and/or the processor 148. Non-volatile memory 146 includes a range of non-volatile memories including hard drives, SSDs, DVDs, Blu-Rays, etc. User interface 145 includes displays (e.g., touch-screen, VR), lights, keyboards, buttons, and other devices that enable user interaction with the computing system. Telematics 144 enables both wired and wireless communication with external entities via Bluetooth, cellular data (e.g., 3G, LTE), USB, WiFi, etc.

Actuators/motors 143 produce tangible results. Examples of actuators/motors 143 include drone motor assemblies 15 and the resistive heating elements. Local sensors 142 transmit digital or analog readings or measurements to processors 148. Examples of local sensors 148 include temperature sensors, rotation sensors, speed sensors, cameras, lidar sensors, radar sensors, infrared sensors, ultrasonic sensors, clocks, moisture sensors, rain sensors, light sensors, door sensors, weight sensors, etc.

Figure 17:
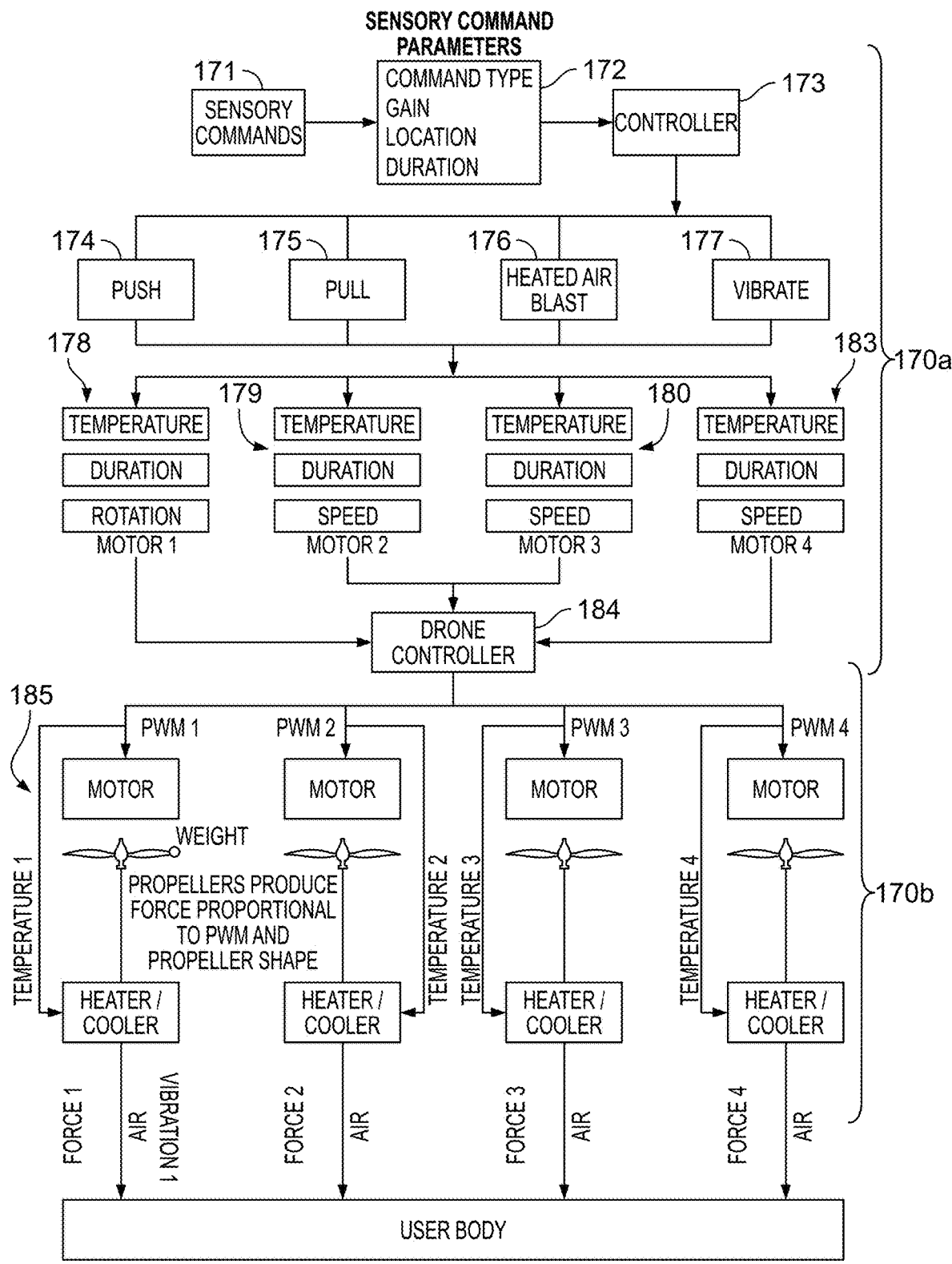
FIG. 17 is a block diagram of translating sensory commands into motor commands.

FIG. 17 is a block diagram of internal communication in VR arrangement 150. These internal communications control drones 10 and the resistive heating elements based on gaming activity. The internal communications may be separated into a first group 170*a* and a second group 170*b*. First group 170a may be performed by gaming system controller 151a and/or stadium controller 120a. Second group 170b may be formed by drone controller 10a. FIG. 17 only shows internal communications directed to a single drone 10, although the methods and operations may be applied to a plurality of drones, as discussed below.

At block 171, sensory commands are generated (discussed below with reference to FIG. 22). Sensory commands are generated by gaming system controller 151a and/or stadium controller 120a and are based on gaming activity. Sensory commands include sensory command parameters shown in block 172. Sensory command parameters identify and quantify the desired sensory outcome. One example desired sensory outcome is air at 80 degrees F. being blown onto a user's face from 3:01 pm to 3:02 pm. Another example desired sensory outcome is the user experiencing a predetermined force or moment from 3:01:01 pm to 3:01:02 pm.

Sensory command parameters can be grouped according to command type. One command type may be heat. Another command type may be inertial. Inertial commands may be sub-segmented into vibratory or haptic commands and force or moment commands. Each command type may include a location (i.e., location of desired effect on the user's body), a gain (an amount of the desired effect), and a duration (a start time and an end time).

At block 173, a final body model 210 may be referenced. Based on final body map 210, the sensory command may be translated into one or more drone commands. Drone commands are shown in shown in blocks 174, 175, 176, and 177. If multiple drones are present then drone commands 174, 175, 176, 177 may be generated for each respective drone.

Figure 18:
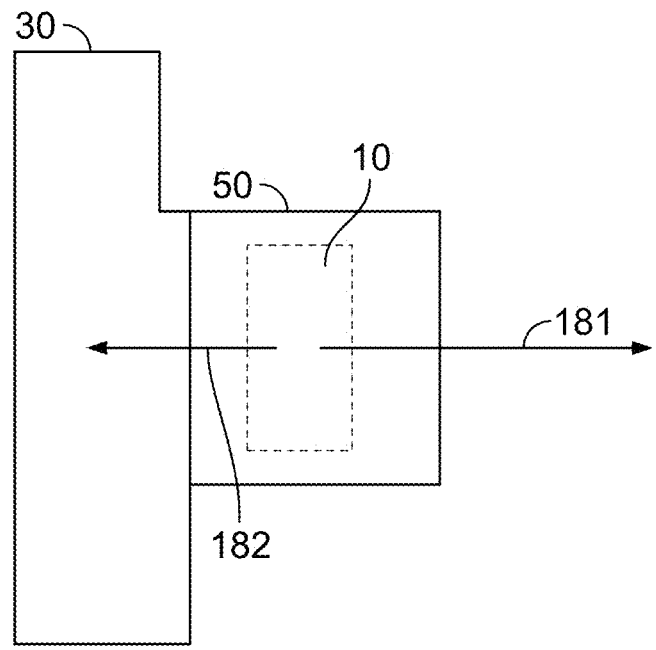
FIG. 18 is a schematic of the vest mounted to the drone cage assembly. Fastener assemblies of the vest and drone cage assembly are omitted.

A push command 174 directs drone 10 to apply a force toward the user's body. A pull command 174 directions drone 10 to apply a force away (opposite to) the user's body. Push and pull commands 175, 175 include a timed force vector. The timed force vector represents a magnitude of the desired force, a direction of the desired force, and a duration of the desired force. FIG. 18 is a schematic of a vest 30 (worn by a user—not shown), a drone cage assembly 50, and a drone 10. A pull timed force vector 181 has a larger magnitude and is parallel with respect to ground. A push timed force vector 182 has a smaller magnitude and is parallel to ground.

A heated air blast command 176 directs drone 10 to push an airstream at a certain temperature toward the user's body. A heated air command 176 includes a timed force vector and a temperature. The timed force vector represents the magnitude of airflow incident upon the user. The temperature represents the desired temperature of the airflow at the time of incidence.

A vibrate command 177 directs drone 10 to vibrate the user's body. A vibrate command 177 includes a timed magnitude. The magnitude represents the magnitude of the vibration and may thus be represented by amplitude and/or frequency of the vibration.

Drone commands 174, 175, 176, 177 are then broken down into motor and resistive heater commands 178, 179, 180, 183. The breaking-down process may rely on final body model 210. For example, the final body model 210 may include features of each rotor assembly 12. Only one rotor 14 may be secured to a haptic weight 14a. As such, the one rotor is only commanded to be active when vibration is desired. When a directional inertial force, and not a vibration, is desired, the other rotors may be activated. Each of these commands includes a temperature (temperature of the feature transferring heat to air), a duration, and a rotor rotation speed. Motor and resistive heater commands 178, 179, 180, 183 are sent to drone controller 10a at block 184.

At block 185, drone controller 10a governs rotor 14 rotation (by controlling the motor in motor assembly 15) and rotor temperature (by controlling the resistive heater in motor assembly 15). If the resistive heater is in another location, such as drone cage assembly 50, then the resistive heater temperature command may be routed to a drone cage assembly controller. Thus, although the description below may refer to drone controller 10a, operations may be performed by drone controller 10a and the drone cage assembly controller.

During block 185, drone controller 10a regulates motor rotation speed via a pulse-width-modulation (PWM) technique to achieve the desired rotor 14 rotational speeds. Drone controller 10a regulates resistive heating elements via a similar technique (e.g., via duty cycle modulation). Drone 10 includes speed sensors, temperature sensors, and gyroscopic sensors. Drone 10 applies these sensors to generate a continuous feedback loop and to thus iteratively readjust PWM and duty cycle signals based on reports from the drone sensors. Drone controller 10a continues until the duration has been achieved. Drone controller 10a simultaneously and independently regulates each motor assembly 15.

To improve and reduce latency, drone 10 may store a queue of future motor and resistive heater commands 178, 179, 180, 183. As such, gaming system controller 151a and/or stadium controller 120a may be configured to predict future drone commands, corresponding future motor and resistive heater commands, and command drone controller 10a to store such future motor and resistive heater commands.

Block 191 represents a current set of motor and resistive heater commands 178, 179, 180, 183. Block 191 begin at time 191a (e.g., five seconds in the past) and will continue until block 191b (e.g., two seconds into the future). Blocks 192, 193, and 194 represent future motor and resistive heater commands. Block 192 begins when block 191 ends (e.g., two seconds into the future). Block 193 begins when block 192 ends. Block 194 begins when block 193 ends.

Gaming system controller 151a and/or stadium controller 120a continuously revise predictions based on (a) new gaming activity, (b) adjustments to the user map, and (c) adjustments to the drone map. Thus, gaming system controller 151a and/or stadium controller 120a are configured to swap out, substitute, or revise future motor and resistive heater commands in the queue. These features are further discussed below.

Figure 20:
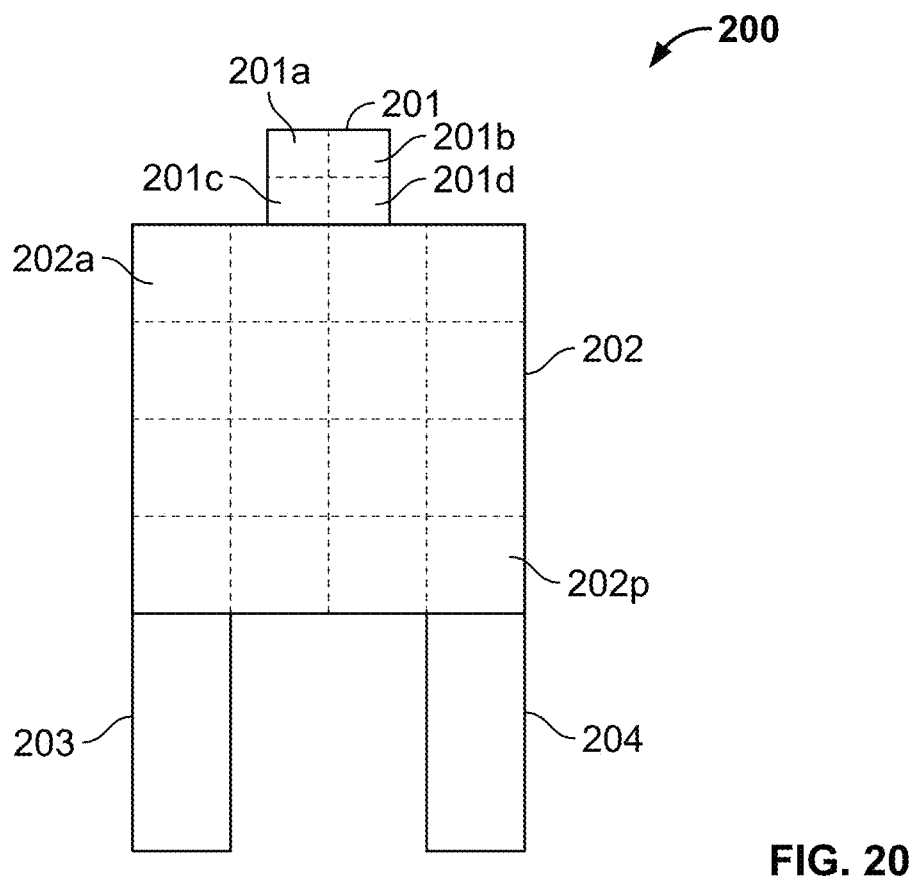
FIG. 20 is a front plan view of an initial body model.

FIG. 20 is a front plan view of an initial body model 200 for eventual modification in light of vest 30, drone cage assembly 50, and drone 10. One or more cameras (e.g., mounted to stadium 120) may take a picture of the user. One of the above-discussed controllers (e.g., gaming system controller 151a and/or stadium controller 120a) (referred to as "the controller") may apply image processing software to map a head 201, a chest 202, legs 203 and 204, and arms (not shown). The map may be three-dimensional. The mapped body parts may be approximations and rectangular to limit complexity of computation. Each body part may be divided into sectors. For example, the head 201 may be divided into four sections 201a to 201d. Chest 202 may be divided into sectors 202a to 202p. Based on the user's weight detected by weight sensor 126, the coordinates of the body parts, and preloaded statistical algorithms, the controller may assign a center of mass to each of the mapped body parts and/or the overall body.

Figure 21:
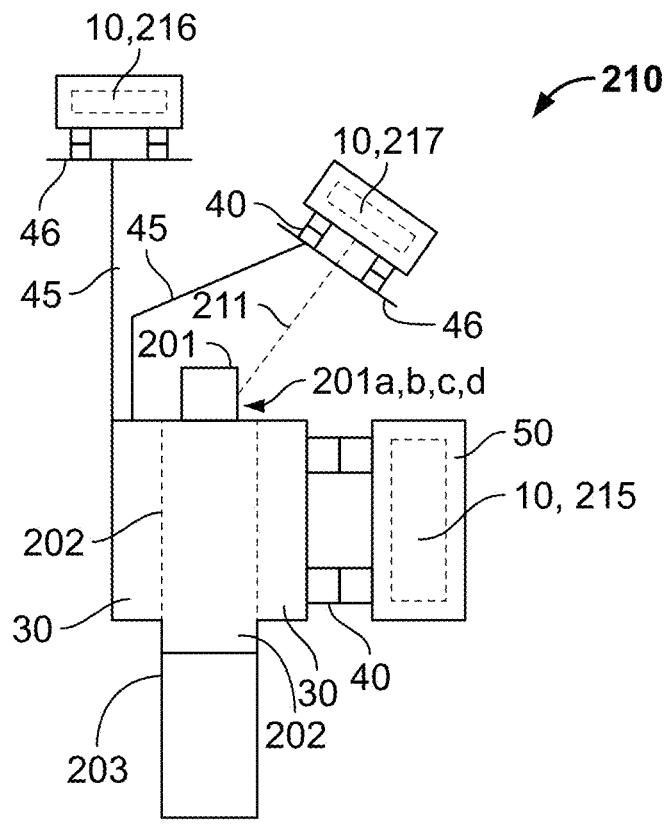
FIG. 21 is a side plan view of a final body model.

FIG. 21 is a side plan view of a final body model 210 for reference during building of drone commands. In FIG. 21, models of vest 30, drone cage assembly 50, and drones 10 are mapped onto initial body model 200. A center of mass of each of vest 30, drone cage assembly 50, and drone 10 are determined. Based on the relative positions and geometries of the body model, vest 30, drone cage assembly 50, and drones 10, one or more air flow paths are determined. More specifically, air flow paths are determined to exist between any unobstructed rotor 14 exhaust port and any section of head 201 and/or a face of head 201. Head 201 and/or the face may be determined to exist in an area below a current location of VR headset 152. More specifically, a current position of VR headset 152 may be determined. Head 201 and/or the face may then be determined to be positioned in an area fixed with respect to the current position (e.g., directly below the current position).

In FIG. 21, an unobstructed air flow path 211 exists between one exhaust aperture 11a of drone 10 (by virtue of the cylindrical apertures defined in plane 46) and head 201. Final body model 210 further includes features and capacities of each drone 10 (e.g., number of rotors, maximum amount of forward thrust available, maximum amount of backward thrust available, identity of rotors 14 with haptic weights 14a, identity of rotors 14 capable of producing airstreams incident on the user's face, etc).

Final body model 210 may be continuously updated as the user moves in stadium 120 to reflect changes in the user's position, and changes in the user's orientation (e.g., bending of head 201 with respect to chest 202). These changes may be detected via the stadium cameras and/or sensors mounted on drones 10. As one example, a gyroscope in a drone 10 connected to the user's chest may be applied to determine an orientation of the user's chest 202. As another example, a gyroscope in VR headset 152 may be used to determine an orientation of the user's head 201. As final body model 210 is updated, the airflow paths 211 may also be updated.

As shown in FIG. 21, a horizontal drone 10, 215 is configured to apply horizontal forces on the user. A vertical drone 10, 216 is configured to apply vertical forces on the user. An airflow drone 10, 217 has an airflow path 211 to the user and is thus configured to generate airflow incident on the user's head. Although only three drones 10 are illustrated, any number of drones 10 (e.g., twenty drones 10) may be active, including an additional drone 10 configured to apply lateral forces perpendicular to horizontal drone 215 and vertical drone 216.

Figure 22:
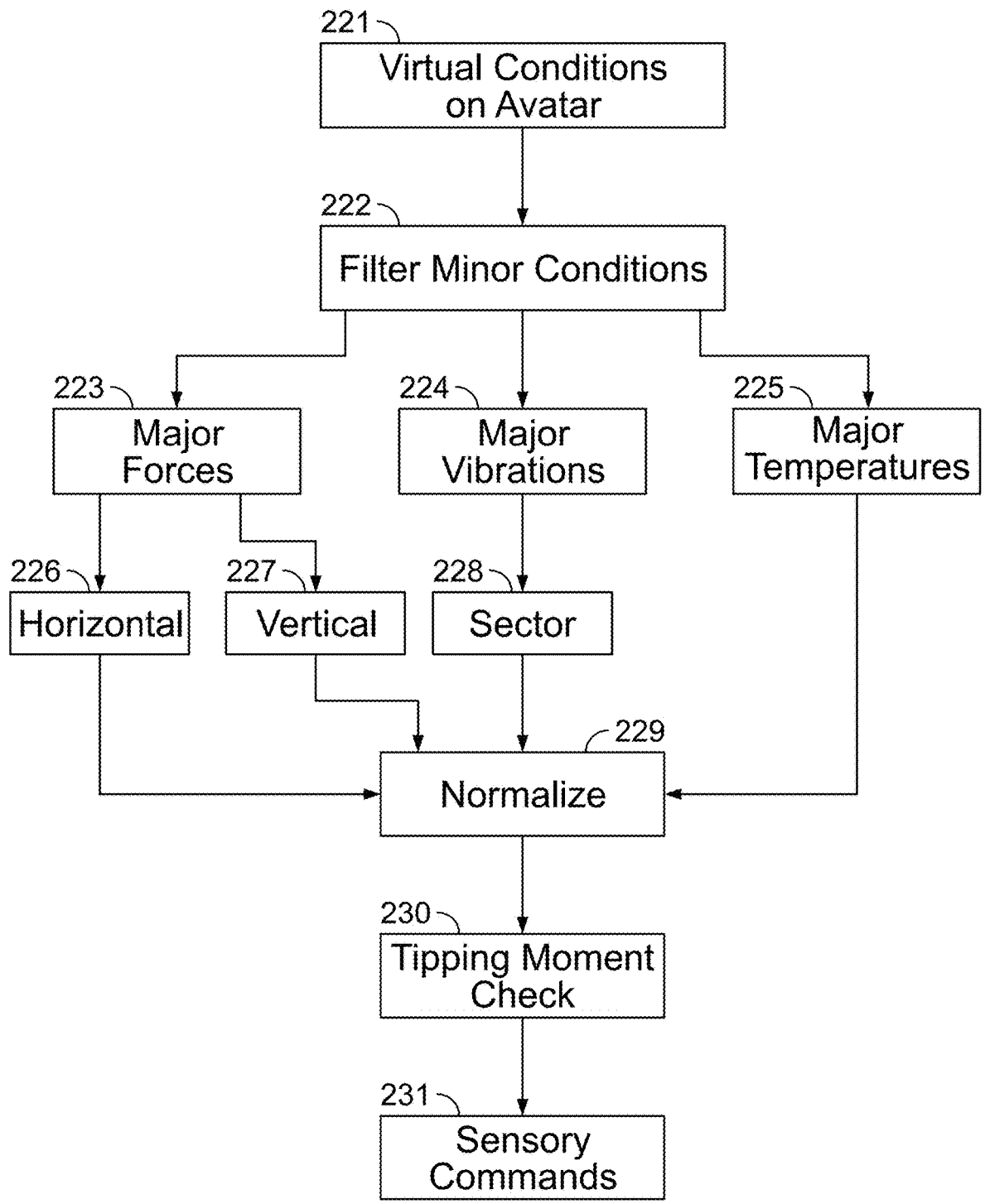
FIG. 22 is a block diagram of generating sensory commands based on events in a VR game.

FIG. 22 relates to generating sensory commands and is performed by gaming system controller 151a and/or stadium controller 120a ("the controller"). The operations of FIG. 22 occur while a user is playing a VR game. During the game, the user controls an avatar within a virtual environment. The avatar is a virtual manifestation of the person. During a racing game, the avatar may be a racing car. During an adventure game, the avatar may be a cartoon character. The virtual environment includes the avatar's static surroundings (e.g., walls, ground) and the avatar's dynamic surroundings (e.g., opposing race cars, fires).

The VR game includes a physics engine, as is known in the art. HAVOK®, for example, offers one kind of physics engine. At block 221, the physics engine computes conditions incident upon the avatar, such as airflow (and temperature thereof), forces, vibrations, etc and governs status of the avatar accordingly. For example, if an avatar racing car bumps into a wall, the physics engine simulates interaction between the racing car and the wall and modifies the status of the racing car and/or the wall accordingly. More specifically, the physics engine projects a force exerted by the wall onto the racing car and a force exerted by the racing car onto the wall.

The racing car's status modification may thus include a change in velocity vector (i.e., heading), severe vibrations, and a crumpling of the front bumper. The wall's status modification may include a formation of a crack. As another example, if the avatar racing car is tailgating an opposing race car, the physics engine may project heat flow from exhaust of the opposing race car onto the avatar race car. As another example, if an avatar is walking along ground, the ground projects a normal force to counter the avatar's gravitational force.

As demonstrated by these examples, the VR game includes continuous minor avatar conditions (e.g., normal force from ground) interspersed with major avatar conditions (e.g., crashing into the wall). At block 222, the controller analyzes the conditions and applies filters to ignore minor conditions in favor of major conditions. With respect to inertial force conditions, the controller may determine that a major force condition exists for a certain duration, at block 223, when a force exerted on the avatar exceeds a predetermined magnitude. With respect to inertial vibration conditions, the controller may determine that a major vibration condition exists for a certain duration, at block 224, when a vibration of the avatar exceeds a predetermined frequency and/or a predetermined amplitude.

With respect to airflow conditions, the controller may determine that a major airflow condition exists for a certain duration, at block 225, when a temperature of the avatar's surroundings increases above a predetermined temperature and/or when air is traveling at a certain speed with respect to avatar (e.g., the avatar is running while virtual air is static, thus causing the avatar to experience wind). If the physics engine is not equipped to determine temperature and/or airflow, then the controller and/or the game may be configured to follow progression of the game, recognize events, and associate certain events with temperatures (e.g., a fire within a predetermined distance of the avatar automatically counts as an extreme temperature condition). A similar concept may apply to vibrations. The predetermined values may be precoded into the game. The predetermined values may be based on a running average of previous similar values (e.g., the predetermined temperature is set to be 30% or greater than the running average of temperatures over the previous two minutes). Any suitable statistical algorithm may be applied to separate major conditions from minor conditions.

At blocks 226 and 227, major inertial forces upon the avatar are segmented into horizontal components and vertical components. At block 228, a sector of vibrations incident upon the avatar is determined (e.g., coordinates of a center of the vibration). It should be appreciated that additional properties of major forces, major vibrations, and major airflows are additionally determined, but not shown, such as magnitude or degree, duration, etc. This sector is relevant when more than one rotor 14 is secured to a haptic weight 14a.

At block 229, magnitudes of the major conditions are normalized according an expected range of major conditions. For example, a crash into a virtual wall at 100 mph may be mapped to a maximum horizontal force and a crash into a virtual wall at 30 mph may be normalized to 10% of the maximum horizontal force. At block 230, the controller translates the normalized conditions into forces and/or airflows (including temperature) to be applied by drones 10. For example, the 10% normalized horizontal force may be mapped to 10% of the thrust capability of horizontal drone 10 (or the total horizontal thrust capability of all drones 10). Specific drones (e.g., horizontal drone 215, vertical drone 216, and airflow drone 217) may be designated for specific tasks (e.g., horizontal inertial forces and vibrations are covered by horizontal drone 215, vertical inertial forces are covered by vertical drone 216, and airflow tasks are covered by airflow drone 217). All drones may be configured to produce vibration (i.e., include at least one rotor with a haptic weight 14*a*).

The controller may compensate for forces upon the user due to drones 10 performing different kinds of tasks. For example, airflow drone 217, being secured to the user, will generate force upon the user when active. The applied forces relates to a direction of the airflow relative to the person, a speed of the airflow, etc. Thus, when airflow drone 217 is active, the controller may reduce horizontal forces generated by horizontal drone 215 by an amount based on the horizontal force component generated by airflow drone 217. If the user is not supposed to experience any vertical forces, the controller may cause vertical drone 216 to cancel out (i.e., oppose) the vertical force component generated by airflow drone 217.

The same concepts apply to vibration (i.e., the controller may cancel out net directional forces produced by the vibration with other drones). When a specific drone is executing different tasks (e.g., horizontal drone 215 is vibrating and producing horizontal force), the non-vibratory rotors 14 may be controlled based on the horizontal force produced by the vibratory rotor 14. Put differently, the horizontal force exerted by the vibratory rotor 14 may be calculated and then the supplemental force required from the other non-vibratory rotors 14 may be determined based on the horizontal force exerted by the vibratory rotor 14.

The same concept applies to airflow drone 217. If the heat produced by one rotor is insufficient, due to limitations of the associated resistive heater, additional rotors and associated resistive heaters may be activated to deliver a quantity of heat that will result in the desired temperature incident upon the user. The controller may determine the amount of heat required based on (a) an expected speed of the heated airflow when incident upon the user, (b) a measured moisture level of air, (c) a measured current temperature of ambient air between airflow drone 217 and the user or surrounding the user, (d) an airflow distance between the rotor and the user. Moisture level and current temperature may be measured with moisture and temperature sensors in operative communication with the controller. The airflow distance and expected speed may be determined based on final virtual model 210.

Airflow drone 217 may be disconnected from the user such that forces exerted by airflow drone 217 are not applied to the user (besides force due to airflow). As such, the controller may be configured to cause airflow drone 217 to direct airflow away from the user when airflow drone 217 is hovering (e.g., by pointing airflow toward a portion of ground distance from the user). When airflow is desired, the controller may cause airflow drone 217 to direct airflow to a specific sector (e.g., a corresponding sector of avatar experiencing airflow and/or the user's head and/or face). Alternatively or in addition, when airflow is desired, the controller may cause airflow drone 217 to move from a spaced hovering position to a position above the user's head and/or body (calculated with reference to the final body map as discussed above). To minimize latency, the controller may pre-plot and pre-load a flight path for airflow drone 217 using the above and below discussed latency reduction techniques. Vertical drone 216 may be applied as the airflow drone. A plate separating vertical drone from the user (e.g., plate 46) may include actuatable covers. When airflow is desired, the covers may be opened. When airflow is not desired, the covers may be closed. When the covers are closed, the plate diverts airflow away from the user.

At block 230, a safety check is run against the horizontal and vertical forces expected to be delivered by horizontal drone 10 and vertical drone 10. More specifically, a net horizontal force vector and a net vertical force vector applied to final body model 210. The magnitudes of the vectors correspond to the magnitudes of the forces expected to be exerted by drones 10. The locations of the vectors are based on the attachment location(s) between the respective drone 10 and vest 30. For example, the net horizontal force vector may be set to extend through a virtual center of the four attachments between drone cage assembly 50 and vest 30.

Based on the previously discussed centers of masses of final body model 210 and the vectors, the controller computes one or more moments to be applied on the user's body. The moments are netted and compared with a predetermined moment limit. The forces are canceled or reduced if the comparison shows that the net moments exceed the predetermined moment limit and could thus tip the user. Forces due to vibrations and torque events may also be accounted for in calculating the one or moments.

At block 231 (corresponding to block 171 of FIG. 17), the sensory commands are generated based on the major conditions and their properties. The kind of the major condition corresponds to sensory command type of block 172. The properties of the major condition correspond to the other sensory command parameters of block 172.

According to some of the above examples, horizontal drone 10 applies all horizontal forces exerted on the avatar. However, the controller may be configured to only apply horizontal drone 10 for forward and backward forces (which are perpendicular to the avatar's chest area). As such, and as previously discussed, an additional drone 10 may be provided, facing in a direction perpendicular to horizontal drone 10 and vertical drone 10, to account for lateral forces.

As the number of applied drones 10 increases, the resolution of the above-discussed conditions may be increased. For example, with multiple horizontal drones 215, the controller may be configured to exert forces on specific sectors of the user's chest 202. As such, the controller may be configured to select drones based on the specific sector of the avatar exposed to the virtual condition. As previously discussed, some drones 10 may be applied by the controller purely to cancel out unwanted or unintended forces, torques, etc. exerted by other drones 10 to yield (or at least best approximate) only the net desired force through the net desired sector.

Although not shown, each drone may be configured to exert torques. For example, if two adjacent rotors 14 of drone 10 are spun in a first direction, and the other two adjacent rotors 14 of drone 10 are spun in an opposite direction, drone 10 will apply a torque onto the user. A quad-rotor drone 10 is thus configured to apply torque in at least four directions. As such, the controller may be configured to recognize major torque events, directions and magnitudes thereof, and generate corresponding sensory commands, which as previously discussed, eventually translate into motor commands.

Figure 19:
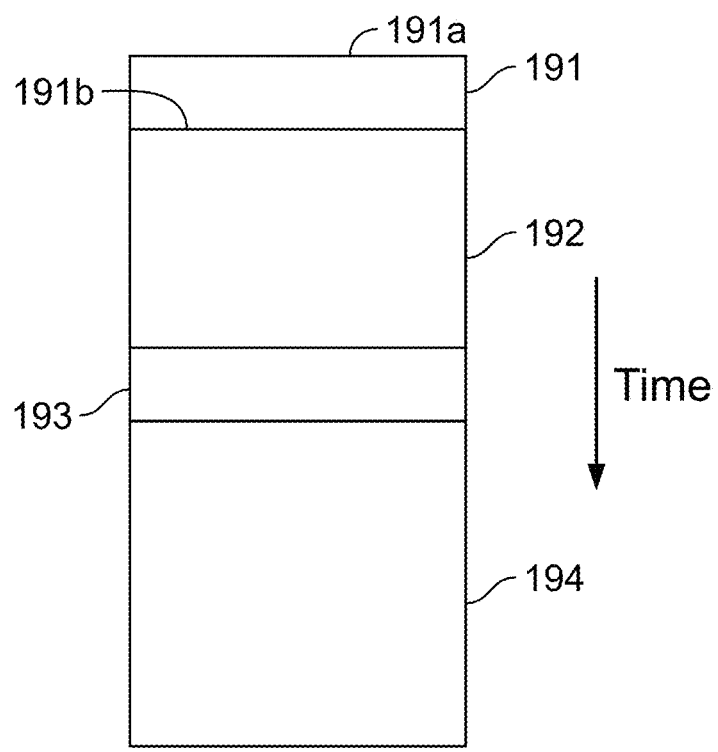
FIG. 19 is a block diagram of a drone memory queue.

As previously discussed with reference to FIG. 19, the controller may be configured to queue drone commands. To assist, the VR game may be configured to output a list of probable avatar conditions and associated durations (as previously discussed duration may include an initial condition such as future start time in addition to a time length). The controller converts the probable avatar conditions into sensory commands, drone commands, and ultimately motor commands. As discussed with reference to FIG. 19, the controller preloads the motor commands in drone controller 10*a*. The controller may preload only the most probable motor commands or may preload multiple probable motor commands into drone controller 10*a*. As the avatar interacts with the virtual environment, the group of probable avatar conditions collapses into one or more actual avatar conditions.

Upon collapse, if motor commands corresponding to the actual avatar conditions are already stored in drone controller 10*a*, then the controller may either take no action and allow drone controller 10*a* to automatically implement the set of most probable motor commands. As a result, each set of motor commands stored in drone memory 10*a* (a set of motor commands corresponds to commands for each motor 15 of drone 10) may be appended with a probability marker and drone controller 10*a* may be configured to automatically implement motor commands with the greatest probability marker. Alternatively or in addition, the controller 10*a* may send a release signal to drone controller 10*a*, causing drone controller 10*a* to select and implement a certain set of preloaded motor commands (i.e., change the probability markers).

To minimize latency, the controller may determine that "corresponding" motor commands have been preloaded when a preloaded motor command produces an effect in the same direction as the actual avatar condition. For example, if a preloaded motor command increased temperature on the user's face from 68 degrees F. to 73 degrees F., but the actual avatar condition would produce a heat of 78 degrees F., the controller may allow the drone controller 10*a* to execute the preloaded motor command, shorten a duration of the preloaded motor command, and insert a new motor command matched with the actual avatar condition in the time-gap resulting from the shorter duration. On the other hand, if a preloaded motor command would result in a lower temperature (e.g., by cutting power to a resistive heating element), but the actual avatar condition would produce a greater temperature, then the controller may instruct the drone controller 10*a* to cancel the entire preloaded motor command set and the controller may issue a replacement.

Although various components have been described with reference to VR, these components may be applied to non-VR contexts. For example, drone 10, vest 30, and drone cage assembly 50 may be applied to supplement a user's motion (by adding drone power) when playing a sport. Thus, and as previously discussed, the claimed inventions are not limited to any specific context (such as VR) unless such context is positively claimed.

Possible Additional Features

The following text includes disclosure from the above-referenced provisional patent application. One or more of the following disclosed features may be present in drone 10 and/or VR arrangement 150.

Consumers seek methods of heightened audio immersion and tactile/haptic feedback from their multimedia entertainment devices. Consumers apply drone technology, and are looking for ways to make the drone experience more meaningful.

With regard to audio, the typical audio speaker systems of today require listeners to position themselves between stationary right and left speakers for optimum experience of stereo sound. This requires the listener to remain in a fixed position relative to the speakers. If the listener wishes to move around and still optimize their stereo audio experience, they must wear ear phones or ear buds. This fully disconnects their auditory connection to the outside world. It would therefore be advantageous to have an audio system that does not require the listener to remain stationary, while still having benefit of optimal speaker proximity and also maintain auditory connection to ambient environmental sounds while free of hassle of wearing ear phones or buds. The present disclose enables the user this freedom to enjoy music and other digital media content while providing added multi-level visual and tactile experiences.

The first level experience is delivered via powerful, miniature, full range speakers that are held aloft using aerial drone design. This system will allow the listener the freedom of movement in and about the home or other environments while one or more audio speaker drones stay in optimal proximity delivering audio to the listener. Added unique entertainment advantage would be novel sonic reproductions produced as the speaker drones fly in programmed patterns around the listener that synchronize their aerial movement to the rhythm, pulse, and tonality of the music. The speaker drones can be programmed to follow the user around the home, or outdoors, as well as be programmed to return to various recharging platforms/docking stations to recharge while still producing audio when docked.

The second level experience of drone performance would be a haptic one, where audio synchronized propeller rotation drives bursts of air directed toward the user. Quick changes in propeller rpm, synchronized with movement to audio, produce air pressure waves felt by the user when in close proximity to flight patterns, creating audio and haptic feedback in synchrony with the all types of digital media. For example, the drones could orbit around the user while emitting audio synchronized bursts of pressure waves that the user feels, producing a multisensory experience.

The third level experience occurs with the drones locked-down on docking stations. The same air pressure wave effect can be used to produce a variety of haptic stimuli synchronized to the audio and video of entertainment content. In this case, ear phones could also be used in place of the drone speakers while still feeling the audio synchronized haptic pressure wave bursts. An explosion, for example, heard on the head phones while watching a movie or playing a video game, would be felt as a haptic pressure wave created by the drone propellers that is synchronized to the audio cue. Temperature haptic feedback can be also employed with this application based on how air bursts of varying temperatures are perceived by thermoreceptors on the skin surface synchronized to video and audio content. These effects intensify realism, for a more immersive effect.

The fourth level experience is a haptic feature utilizing one or multiple wearable docking stations that allow the drones to be attached directly to the body. This would allow more intimate and real time simulation of vector haptic feedback for use with virtual reality devices and video games that provide visual simulations of inertial changes. For example, during a virtual reality simulation of downhill skiing, the user would feel wind rushes and body inertial pushes and pulls that are synchronized in direction and intensity with the movement and projected velocity of the simulation. This level can also include totally unique and patentable coupling of air pressure and air temperature haptics with unique vibratory haptics that employ a patentable counter-weight modification of the drone propellers.

Disclosed are one or more powered flying drones capable of carrying aloft a compact full range audio speaker, amp, and power supply. The drones are equipped with wireless receiver chips for streaming audio, such as a Bluetooth receiver capable of processing audio streaming to deliver audio entertainment to the user or users. In addition to receiving wireless audio signals for the purpose of sound transmission, one added entertainment mode may involve a flight control module capable of being influenced to alter flight patterns in a fashion choreographed with the specific musical rhythms. The drones would have the capability of returning to docking stations that also act as recharging stations. The system can include an option for a floor-based mobile bass woofer module that follows the aerial speaker drones while producing low end bass/sub-woofer tones.

A stationary use mode would be available, where the drones while docked with their propeller motors off could be used as traditional stationary speakers anywhere in the home were docking stations are placed.

In a locked-down haptic mode, the drones would be anchored to docking stations in a way that directs the air from their propeller bursts in various directions to impact different body parts, based on wireless signals that are synchronized with the audio and video from high energy formats in video games and movies, adding a layer of realism to high energy audio-visual formats.

In the wearable haptic mode, for virtual reality use, docking units can be placed on various parts of the body depending on how the virtual reality content is structured to allow the most appropriate parts of the body to experience haptic feedback from air pressure waves, temperature variations, and vibration.

Application 1

Figure 23:
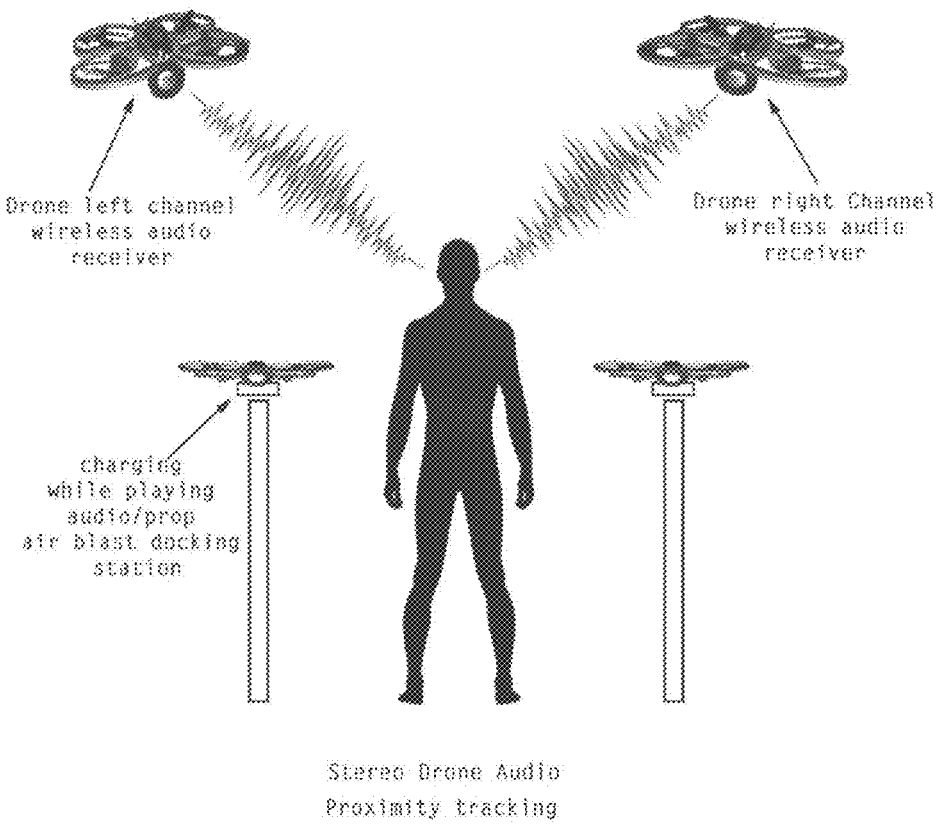
FIG. 23 shows an aerial audio application with two audio drones in flight of each side of a listener.

One or more battery-powered flying drones, capable of carrying aloft, in payload position, a compact full range audio speaker, amp, and power supply capable of receiving wireless audio streaming to deliver audio entertainment to the user or users (see FIG. 23). Modes for audio transmission would be Bluetooth or Wi-Fi or any other wireless transmission. This signal my also provide navigation command packet instructions, but may also be used with an independent radio frequency for flight commands. The drones would have the capability of returning to docking stations that also act as re-charging stations. Two such drones flying in synchrony are preferable to deliver full range stereo sound. The drones are fitted with appropriate transponders and GPS sensitive flight control modules that are programmed with standard estimation and control algorithms that cause them to fly in a programmable manner keeping them following at optimal way point distances from each other as well as the listener while moving, or at the optimal position hold points while the listener is stationary. A GPS auto enabled fallow technology-based system may be deployed. In addition, a GPS from a smart phone or other dedicated device can be used for such flight control purposes.

The drones may also incorporate a visual positioning system which uses a downward facing camera and two ultrasonic sensors to guide landing and flying indoors or somewhere without GPS. The camera will create a real-time map of the ground below, identifying a grid where it can plot safe flight points and safe places to land. This concept can also work to map out the walls and furniture in the home and compensate accordingly. If the drone drifts away from scheduled plight points, it can visually triangulate to correct itself and stay locked in position or programmed flight pattern. Obstacle avoidance sensor technology can be employed as another preferred application, such as a 360 degree infrared system or a WiFi module for connection with smart devices. By using such technologies, the drones can fly safe indoor and outdoor routes, and land safely on their docking stations. Docking stations can contain a magnetic system that helps with landing guidance such that the drones come to rest in the right place and connect properly to magnetic charging points. This magnetic system will to insure charging, but not restrict takeoff.

The drones would be fitted with the quietest motors and prop design technologies available to minimize intrusive mechanical and propeller noise. Noise reduction could involve, but not be limited to, several small "brushless electrical" motors that are quieter than one or two larger ones, that would also prevent the sound from the propellers combining into one loud noise or harmonic. Light weight power supply, such as, but not limited to, lithium polymer batteries can be employed to keep drone weight minimized, so smaller, quieter motors can produce adequate lift. Bigger propellers with lower pitch are quiet and can help reduce noise. Another noise reduction variation would be to have a balloon or blimp style drone with very small motors and props.

The system can include an option for a floor-based mobile bass woofer module that follows the aerial speaker drones while producing low end bass/sub-woofer tones.

In addition to receiving wireless audio signals for the purpose of audio communication, one added entertainment mode may involve a multichannel onboard flight control module with a "fast response" electronic speed controller that can accommodate estimation and control algorithms capable influencing roll, pitch, yaw, and acceleration flight patterns in a fashion choreographed with the specific musical rhythms, tonality, amplitude, panning, and tempo, by analyzing the incoming audio envelope with detectors using either half-wave or full-wave rectification of the signal to convert the AC input into a pulsed DC current. Filtering is then used to smooth the final result to produce smooth audio synchronized aerial movements while delivering audio to the listener, creating an engaging "dancing drone" visual aerial display. This technology may involve accelerometers and gyroscope sensors to analyze the movement of the drone to determine flight characteristics and audio synchronized motor control patterns. The design goal is to have multi solution audio synchronization of propulsion changes to produce the audio synchronous flight. For instance an audio pitch detector circuit reading the incoming audio may change the altitude of the drone by instruction sets determined by the audio pitch detector that are sent to an ultrasound altitude indicator to command instructions for the drone to change altitude. A beats-per-minute (BPM) indicator circuit can be linked to pulse the drone motors in a rhythmic pattern synchronized to the audio track. A spike in music amplitude detected by a noise gate may trigger the flight module to cause the drones to flip, rock, or roll. The firmware for the operations in these and all the modalities of the proposed technology is key to the function of processors, GPS, Wifi, microcontrollers, microprocessors, sensor gatherers, transmitters, and receivers needed to orchestrate a synchronization of the navigation and flight components with audio components to produce propeller output that causes the drones to enact flight choreography that rhythmically follows the audio production. This is accomplished via the fusion of independent commands programmed in the code of the digital content, or detected via the audio characteristic using the hardware and software designed for all of the applications referred to in this entire document.

The drones may also come with an onboard preset flight choreography module that is designed to activate and produce a preset flight pattern synchronized with a selection of preselected music data uploaded to the drone or played from a smart device. One drone in the pair may be an active drone fitted with an onboard flight instruction module that transmits the same flight and music data to the second drone's music and guidance systems to create a synchronized aerial display. The music and flight patterns may be downloaded to a memory storage module on both drones or transmitted via a smart phone. Users may purchase and download additional presets to the onboard choreography module or store on a smart phone with the appropriate app and Firmware.

The dancing drone concept can also be advanced beyond the concept of two drones, and extended to applications where "dancing drone squadrons" could be used in large venues for entertaining large audiences with complex audio synchronized flight choreography. An audio synchronized light show integrated to the flying drones would be a natural extension to this effect. Yet another modality may be to have individual outputs of a musical production being dedicated to a single drone. For instance drone 1 is the drum track, drone 2 is the bass track, drone 3 is the guitar track, and drone 4 the vocal track. Drones 1, 2, 3, 4 would playback the individual tracks creating the full flight choreographed musical production.

Another theatrical application would be to use all of the drone technology described above to provide onstage dynamic audio monitoring to musicians during live performances. For example, rock band members typically have fixed monitor speakers on stage in front of them that broadcast the sound of their particular instrument or vocal back at them so that they can better hear and focus on what they are individually playing or singing in real time during high volume musical performances. Having this monitor effect supplied to the musician via one or more flying drones would allow the musician more intimate connection to the audio he or she is individually producing by the drones maintaining an optimal distance from the musician's head (similar to what is depicted in FIG. 23), as well as allowing for that intimate connection to be maintained while moving around the stage. A free-flying drone application, as well as a "tethered" drone or drones with unlimited flight time and lower payload requirements due to hardwired, tether-based electric power and audio amplified feed could be applied to this concept. These drones can also be outfitted with audio-synchronized flight choreography capabilities as describe above to add a highly engaging visual dimension for the audience during a live rock band, and other musical performances.

Audio-synchronized LED lights and lasers lights can be attached to the drones to complete the visual effect in all applications described above.

Application 2

Another use mode would be to have docking stations in multiple rooms. In this "stationary audio" use mode, the drones while docked with their propeller motors off can be used as traditional stationary speakers. However when the user leaves the room, the propellers would engage and the drones would fly and follow the user to the next room, docking on the stations in that room, at which time the propellers would shut down. All the while there would be uninterrupted audio from the drone speakers. This would allow uninterrupted audio to follow you around your environment.

Application 3

Another use mode for lengthy audio entertainment pieces would allow the drones to return to various charging stations around the home for recharging while still receiving audio wireless streaming and delivering audio output. The system may come with four or more such charging stations allowing the user to select multiple landing locations. The charging stations would be equipped with homing signal generators to guide the drones to the charging stations when in this mode.

Another approach to the energy requirements of long musical formats would be to have at "tethered" version of the drones. A specific length of tether would connect the drones to a dedicated power and direct audio feed. This would limit their flight range, but would extend their flight time and digital media broadcast time exponentially.

Application 4

This is the locked-down haptic mode, where drones would be anchored to docking stations with ball-jointed or other free pivoting armatures that allow the drones to pivot in a way that directs the air from their propellers in various directions and velocities predicated on signals that are synchronized to the entertainment content, allowing the most realistic directional haptic experience in relation to the digital media content. A delay of the audio may be implemented in some modalities to synchronize the haptic prop air pressure wave to the audio content depending on the drone distance to the user. This application will also add a brand new dimension in haptic feedback—that of temperature. Air busts will provide a cooling effect on the body parts they are directed toward, which can be synchronized to video and audio sequences that reflect scenarios where the body or body part may experience a cooler temperature. The drones can also be fitted with attachable/detachable heating elements that allow for bursts of hot air simulating the temperature haptic associated with fire or an explosion occurring in the video and audio format. (see FIG. 23 docking stations). Application 4 could be modified to one which does not use detachable flying drones, but rather a permanent anchored configuration where all of the motor and propeller generated audio and visual synchronized haptic effects described above are permanent attachments to suitable stationary platforms.

Application 5

Figure 25:
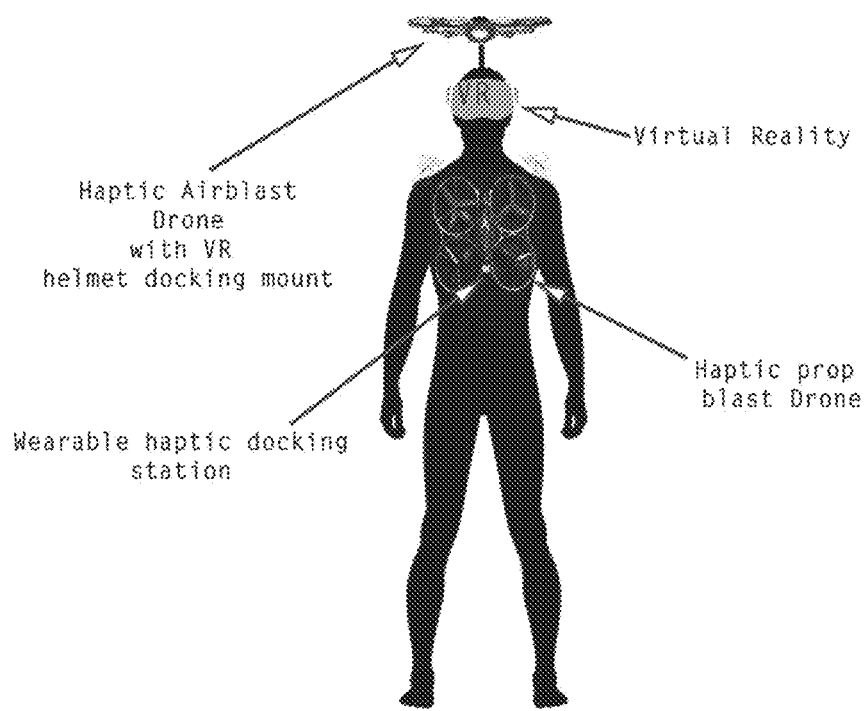
FIG. 25 shows positioning of an overhead drone attached to a VR mask to generate downward air movement.
Figure 26:
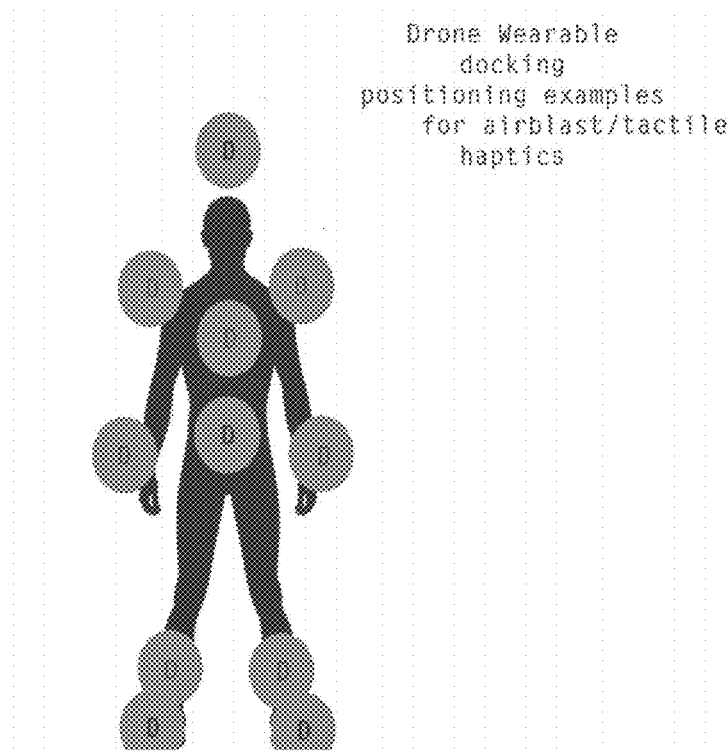
FIG. 26 shows recommended body fixation points for drones in a wearable haptic mode.

This is the wearable haptic mode where drone propeller housings would have attachable protective grids to prevent physical interaction with the propeller blades and the wearer. The drone docking units can be placed on various parts of the body depending on how the virtual reality or other entertainment media content is structured to allow the most appropriate parts of the body to experience haptic feedback (see FIGS. 24 and 26). The docking units could be attached via Velcro or other releasable clasping method to a modular, adjustable body harness system consisting of suitable straps that can be connected together with Velco and adjusted to hug the body, and be adapted to fit firmly on various body parts. The goal would be to keep the docking unit snug against the selected body surface for efficient transmission of haptic feedback. One such docking unit would involve a structural connection to a virtual reality headset that holds the drone above the head to simulate downward air flow and pressure, or the feeling of flight or upward acceleration, such as what one might feel if rapidly ascending in a virtual reality scenario (see FIG. 25). Due to the fact that the drone has 4 independently controllable engines (see FIG. 24), the same kind of flight programming commands that differentially alter individual motor output to create aerial roll, pitch, yaw, and acceleration can be used to impart vector haptic force feedback stimuli to the wearer that simulates inertial changes of the body and the feel of wind change dynamics that are synchronized with virtual reality viewing content, adding the synchronous feeling of haptic feedback to what is being seen in the virtual environment. The main processor of the flight controller would accept a multi-channeled data feed capable of assigning specific synchronized commands to each of the four drone motors independently, to create specific vector haptics that reflect multiple audio and visual effects that occur in real time in the electronic media format.

One application could involve having the docking unit attached to a body harness (as described above) that wraps around the mid-thorax, with the docking unit positioned on the chest at the level of mid sternum. This harness configuration could be further held in place by attachable shoulder harness straps to prevent the configuration from slipping downward off the body. Strong drone propulsion in the horizontal plane away from the body while the user is standing or sitting will simulate the sense of being pushed forward as the back portion of the harness is pulled forward against the back of the body. Strong drone propulsion in the horizontal plane toward the body while the user is standing or sitting will simulate the sense of being pushed backwards.

As an alternative, when positioning the drone on the body harness at the back of the body at mid-thorax level, strong drone propulsion in the horizontal plane away from the body while the user is standing or sitting will simulate the sense of being pushed backwards as the front portion of the harness is pulled backward against the front of the body. Strong drone propulsion in the horizontal plane toward the body while the user is standing or sitting will simulate the sense of being pushed forward. Having choice of a front or back positioning of the drone when used at mid-thorax level may be useful in better matching the specific activities associated with a particular virtual reality scenario such as the feeling of the direction of expected wind effect during simulated body motion.

A wide variety of other body motion vectors can be simulated with this system by having the drone attempt to enact more complex prop maneuvers along a multitude of possible vectors while firmly anchored to the body. This will exert pushes, pulls, and torques against the body associated with the drone's attempts to accelerate, roll, pitch and yaw, as well as the associated air bursts against the body that would be synchronized with virtual reality video and audio content, adding a deeper dimension of realism to the virtual environment. This mode may also be coupled with the temperature haptic effect described in preferred application 4. Modified estimation and control algorithms would be utilized that alter the drone's gyroscopic control to account for the fact that it is being operated from a fixed vertical plane against the body, rather than the horizontal reference normally used in free flight. Multiple drones of different sizes could be used at the same time in more advanced or upgraded applications.

Figure 27:
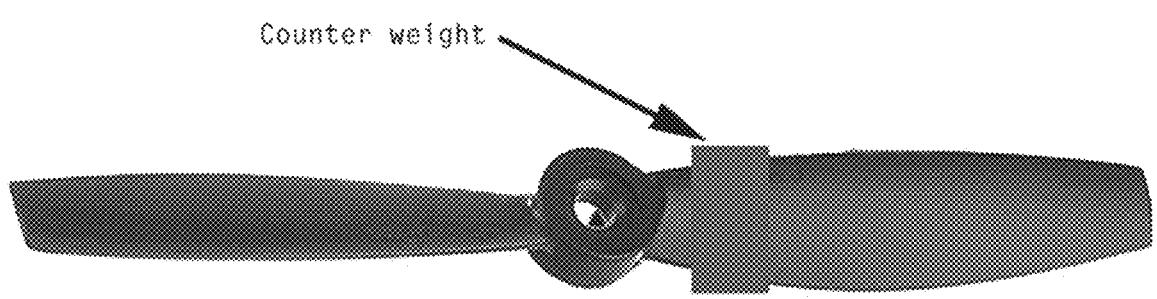
FIG. 27 shows a drone rotor counterweight.

Additional vector force feedback stimulation can be created using a modular attachable and removable counterweight system. Small clip-on weights of varying sizes can be clipped onto one of the two or four blades of a typical propeller. This will create an eccentric weight or cam effect resulting in vibration as the propeller undergoes rotational acceleration. It should be noted that this is a new art in haptic tactile motor actuator use, producing a patentable fusion of air pressure and physical vibration stimulus simultaneously (see FIG. 27). The magnitude of such vibration can be controlled by both propeller rpm values and the size of the weight and positioning of the weight.

Another method would be to have a single weight size, but configure the attachment method of the weight such that it can be slid and then fixed at varying distances along propeller blade from the propeller axis of rotation. The further the weight is positioned from the axis of rotation, the greater the vibratory effect. One or more of the four propellers can be eccentrically weighted this way to produce varying vibratory effects, along with the effects described in the paragraph above. Because of the multichannel flight controller, any single propeller haptic effect or combined haptic effect from any of the four propellers can be selected, as they can be controlled and coordinated via the fusion of independent commands programmed in the code of the digital content or detected via the audio characteristics of multi-track capable hardware and software. This effect will be particularly rich in enhancing the haptic feedback from high energy virtual reality gaming and all entertainment content when synchronized to audio and video cues programmed in to the digital media as instructions to operate the drone motors, or synchronized audio cues gathered and translated/processed to prop or rotor performance. The user can customize the location of vibration haptic by selecting which propellers to place counter weights on.

This effect can be further customized with the use of an attachable/detachable "tactile vibration transmission arm" (TVTA) attached to the drone chassis just below a given motor that is driving a counterweighted propeller. The idea is to transmit vibration from a counterweighted propeller to a chosen area of the body via the adjustability of length and angulations of the TVTA. The "body contact" end of the TVTA can have a variable surface area to customize the amount of body surface area the vibration is transmitted to, as well as the intensity of vibratory haptic.

Figure 24:
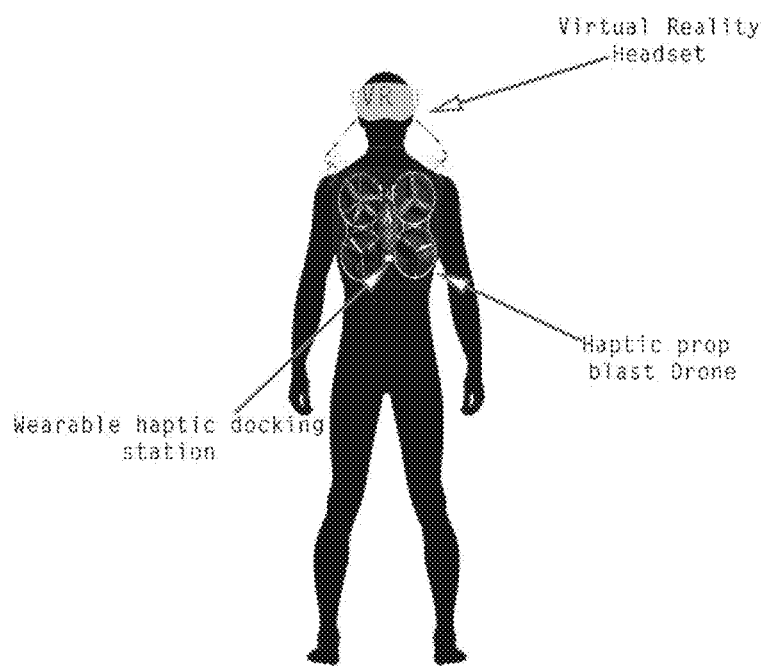
FIG. 24 also details a locked-down haptic mode where drones are applied to simulate air movement when video with high energy audio content is provided.

Each drone propeller shown in FIG. 24 could have an attached TVTA, allowing the user to target and customize where any of four propeller driven vibratory haptic effects can be felt. For example, in a warfare virtual reality scenario where the user is shot, bullets striking specific sides of the chest or abdomen in the animation would be synchronized with vibrations transmitted to the same regions of the body by the selective activation of TVTAs pre-positioned on corresponding sides or parts body of the body. When these haptics are synchronized with the video and audio content associated with being shot, it will give the user the sense of actually being shot in the corresponding areas.

In this application, the docking attachment to the body would be fitted with a dampening material of foam or other suitable material to reduce vibration transmitted to the body directly under the wearable docking station. For applications where this kind of haptic specificity is not desired, the foam dampener and TVTAs can be removed. If the preferred application of haptic vibration is more of a full body experience, the non-dampened docking station can be used with a body harness system made from a suitable vibration conductive material; such that the audio and video synchronized vibration can be transmitted over the entire harness system to the body.

Multiple drones at multiple attachment points on the body can also be synchronized to the same electronic media content described above, for all the purposes described above, for an even more immersive, full body air burst vector haptic, and vibratory haptic effect. The temperature haptic described above can also be employed along with air bust pressure wave and vibration haptics. This creates 3-dimensioned haptic sensory immersion for the enhancement of audio and visual electronic media. Any individual skilled in the art of design could modify preferred application 5 into one which does not use detachable flying drones, but rather utilizes an ergonomically designed, wearable garment-like configuration where all of the motor and propeller generated audio-visually synchronized haptic effects described above are permanent attachments to the wearable configuration.

I claim:

1. A virtual reality system comprising:
   a drone comprising a rotor,
   a display, an audio speaker,
   one or more processors in operative communication with the display, the audio speaker, and the drone, the one or more processors configured to:
     issue audio-visual content to the display and audio speaker,
     control the rotor based on the issued audio-visual content,
   wherein the one or more processors are configured to build a virtual reality environment, issue the audio-visual content to the display and audio speaker based on a status of the virtual reality environment, and control the rotor based on the status of the virtual reality environment,
   wherein the one or more processors are configured to project an avatar into the virtual reality environment, receive a user-originated command, modify a status of the avatar based on the user-originated command and a status of the virtual reality environment, and control the rotor based on the modified status of the avatar,
   wherein the one or more processors are configured to apply a physics engine to determine a virtual force applied by the virtual reality environment onto the avatar, and control the rotor based on a magnitude and direction of the virtual force, and
   wherein the one or more processors are configured to apply the physics engine to predict a future status of the avatar, prepare a rotor control instruction based on the predicted future status, queue the prepared rotor control instruction in memory, and release_ the prepared rotor control instruction from the queue when the predicted future status of the avatar becomes a current status of the avatar.

2. The system of claim 1, wherein at least one of the one or more processors is housed within the drone.

3. The system of claim 1, wherein the drone comprises an eccentric weight attached to the rotor, the eccentric weight causing the rotor to induce vibration when rotated.

4. The system of claim 1, further comprising a body harness having adjustable straps, the drone being fixed to the body harness.

5. The system of claim 4, wherein the body harness comprises a vest, the vest comprising a plurality of fasteners, the drone being secured to the vest via the fasteners.

6. The system of claim 5, further comprising a drone cage assembly, the drone cage assembly being secured to the vest, the drone being confined within the drone cage assembly.

7. The system of claim 6, wherein the drone cage assembly comprises a peripheral housing defining a central void, the drone being disposed within the void.

8. The system of claim 7, wherein the drone cage assembly defines an inner slot extending about a periphery of the central void and the drone comprises a drone housing defining a cylindrical rotor aperture, the drone housing being disposed in the inner slot.

9. The system of claim 8, wherein the inner slot is sized and arranged such that the rotor aperture is unobstructed by the peripheral housing of the drone cage assembly.

10. The system of claim 1, further comprising a resistive heater configured to heat an exhaust stream of the rotor.

11. The system of claim 10, wherein the one or more processors are configured to apply the physics engine to determine a virtual heat or temperature experienced by the avatar, and control the resistive heater based on the determined virtual heat or temperature.

12. The system of claim 1, wherein the one or more processors are configured to, upon determining that a virtual force has been applied onto the avatar, compare the virtual force to a threshold force, and based on the virtual force exceeding the threshold force, control the rotor based on a magnitude and direction of the virtual force.

13. The system of claim 1, wherein the one or more processors are configured to monitor a virtual speed of the avatar within the virtual environment and upon detecting that the virtual speed of the avatar exceeds a threshold, control the rotor based on the virtual speed.

14. The system of claim 13, wherein the display is a virtual reality headset, the system comprises a plurality of drones, each of the drones comprising a rotor, and the one or more processors are configured to project an airflow exhaust path of the plurality of drones, and select the rotor to be controlled based on the virtual speed of the avatar based on the projected airflow exhaust paths.

15. The system of claim 1, wherein the drone is attached to a vest, the vest defining a central void for accommodating a user's body, a neck void for accommodating the user's neck, and opposing shoulder arm openings, the drone being configured to apply force to the user via the vest.

* * * * *